US008275055B2

(12) United States Patent
Zhang et al.

(10) Patent No.: US 8,275,055 B2
(45) Date of Patent: Sep. 25, 2012

(54) RECEIVER FOR DIFFERENTIALLY MODULATED MULTICARRIER SIGNALS

(75) Inventors: Liang Zhang, Ottawa (CA); Louis Thibault, Gatineau (CA)

(73) Assignee: Her Majesty the Queen in right of Canada, as represented by the Minister of Industry, Through the Communications Research Centre Canada, Ottawa (CA)

( * ) Notice: Subject to any disclaimer, the term of this patent is extended or adjusted under 35 U.S.C. 154(b) by 846 days.

(21) Appl. No.: 12/274,037

(22) Filed: Nov. 19, 2008

(65) Prior Publication Data

US 2009/0129493 A1    May 21, 2009

Related U.S. Application Data

(60) Provisional application No. 60/989,142, filed on Nov. 20, 2007.

(51) Int. Cl.
*H04L 27/28* (2006.01)
(52) U.S. Cl. ...................................................... 375/260
(58) Field of Classification Search .................. 375/259, 375/260, 229, 232, 233, 316, 346
See application file for complete search history.

(56) References Cited

U.S. PATENT DOCUMENTS

| | | | | |
|---|---|---|---|---|
| 5,825,241 A | 10/1998 | Beale et al. | | 329/304 |
| 5,841,816 A | 11/1998 | Dent et al. | | 375/331 |
| 6,539,065 B1 | 3/2003 | Furukawa | | 375/316 |
| 7,206,349 B2 * | 4/2007 | Linnartz et al. | | 375/260 |
| 7,277,493 B2 | 10/2007 | Lai | | 375/260 |
| 7,315,587 B2 | 1/2008 | Kobayashi | | 375/331 |
| 2002/0172297 A1 * | 11/2002 | Ouchi et al. | | 375/316 |

OTHER PUBLICATIONS

Botaro Hirosaki, "An Analysis of Automatic Equalizers for Orthogonally Multiplexed QAM Systems", IEEE Transactions on Communications, vol. COM-28, No. 1, Jan. 1980, pp. 73-83.*
O. Edfors, M. Sandell, J. J. V. d. Beek, S. Kate and P. O. Borjesson, "OFDM Channel Estimation by Singular Value Decomposition", *IEEE Trans. on Commun.*, vol. 46, No. 7, Jul. 1998, pp. 931-939.
Dariush Divsalar, Marvin K. Simon, "Multiple-Symbol Differential Detection of MPSK", IEEE Trans. on Commun., vol. 38, No. 3, Mar. 1990, pp. 300-308.
Y. Zhao and A. Huang, "A Novel Channel Estimation Method for OFDM Mobile Communication Systems Based on Pilot Signals and Cepstrum-Domain Processing", in Proc. VTC'97, Phoenix, May 1997, pp. 2089-2093.
D.S. Waldhauser and J.A. Nossek, "Multicarrier systems and filter banks", Adv. Radio Sci., 4, 2006, pp. 165-169.
Ye Li, Leonard J. Cimini, Jr., and Nelson R. Sollenberger, "Robust Channel Estimation for OFDM Systems with Rapid Dispersive Fading Channels," IEEE Trans. on Commun., vol. 46, No. 7, Jul. 1998, pp. 902-915.

(Continued)

*Primary Examiner* — Kevin M Burd
(74) *Attorney, Agent, or Firm* — Teitelbaum & MacLean; Neil Teitelbaum; Doug MacLean

(57) ABSTRACT

The invention relates to receivers and methods for receiving multi-carrier differentially modulated signals utilizing iterative decision-directed differential detection. The receiver includes a decision feedback loop including a channel estimator for estimating inter-symbol channel variations, and a differential equalizer for correcting channel-induced errors in a differentially detected signal based on the estimated inter-symbol channel variations.

23 Claims, 12 Drawing Sheets

OTHER PUBLICATIONS

Robert Schober, Wolfgang H. Gerstacker, and Johannes B. Huber, "Decision-Feedback Differential Detection of MDPSK for Flat Rayleigh Fading Channels," IEEE Trans. on Commun., vol. 47, No. 7, Jul. 1999, pp. 1025-1035.

Arne Sevensson, "1 and 2 Stage Decision Feedback Coherent Detectors for DQPSK in Fading Channels," VTC'95, vol. 2, pp. 644-648, Jul. 1995.

Cost 207 Report, M. Failli (Chairman), "Digital Land Mobile Radio Communications", Commission of the European Communities, Directorate-General, Telecommunications, Information Industries and Innovation, Luxembourg, pp. III-VII, 1-15, 135-143, 157-161, 1989.

Book: *Microwave Mobile Communications* by C. Jakes, Jr., John Wiley & Sons, Inc., New York, pp. 20-23, 65-78, 1974.

\* cited by examiner

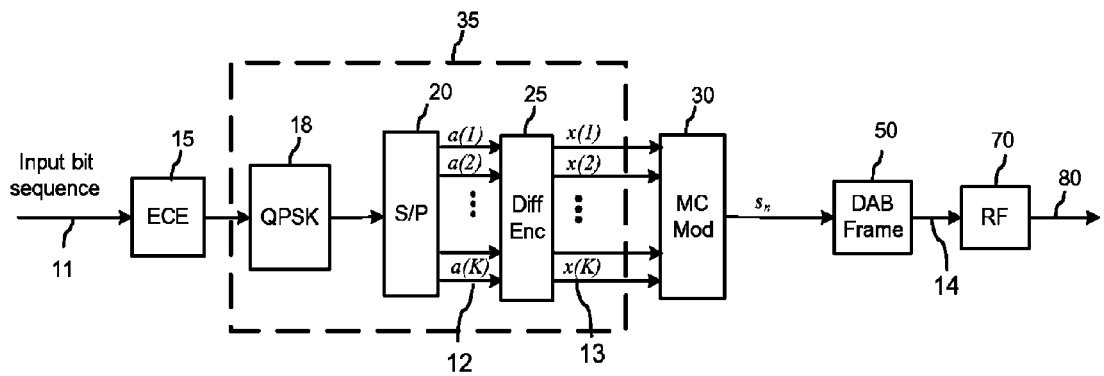
FIG. 1 Transmitter (PRIOR ART)
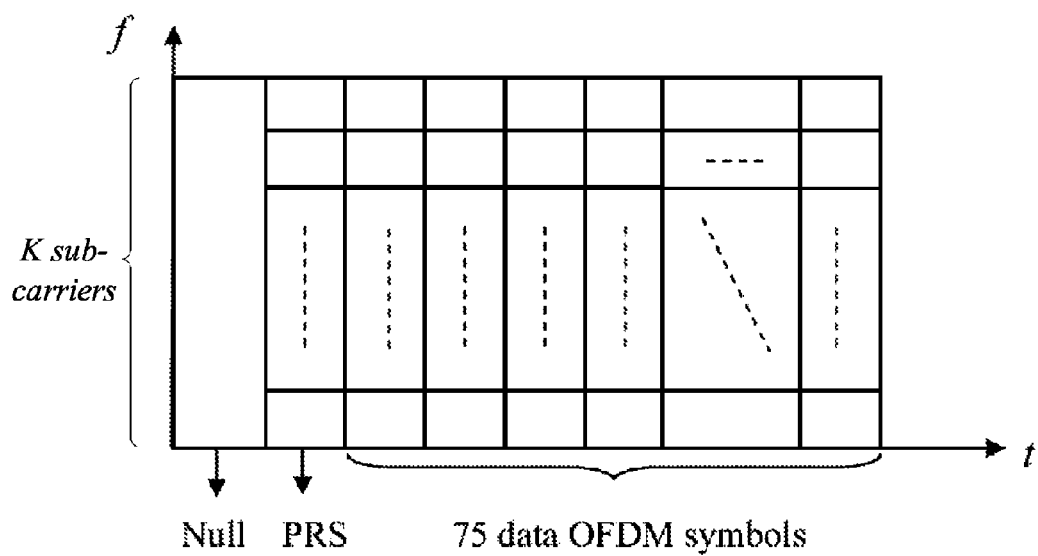
FIG. 2 (PRIOR ART)

RECEIVER FOR DIFFERENTIALLY MODULATED MULTICARRIER SIGNALS

CROSS-REFERENCE TO RELATED APPLICATIONS

The present invention claims priority from U.S. Provisional Patent Application No. 60/989,142 filed Nov. 20, 2007, by Zhang et al., entitled "A Novel Iterative Decision-Directed Differential Detection Algorithm for OFDM with Differential Modulation in Fast Fading Channels", which is incorporated herein by reference for all purposes.

TECHNICAL FIELD

The present invention relates generally to multicarrier wireless receivers, and more particularly relates to a multicarrier wireless receiver which utilizes a differential channel estimation for detecting a multicarrier differentially modulated signal.

BACKGROUND OF THE INVENTION

Because of its inherent robustness against multipath fading in wireless communications, Orthogonal Frequency Division Multiplexing (OFDM) is one of the most popular technologies used in modern high data-rate wireless communication systems. The OFDM is a modulation method in which a wideband channel is divided into a set of K parallel narrowband subcarriers with equal bandwidth. Each subcarrier is modulated by a low-rate data stream, whose data rate is 1/K of the entire high-rate stream. When the subcarrier bandwidth is much smaller than the coherent bandwidth of the wireless channel, the wideband channel with frequency selective fading is turned into K narrowband channels with frequency-flat fading. Furthermore, inserting a guard interval, or cyclic prefix (CP) between adjacent OFDM symbols removes the inter-symbol-interference (ISI) and inter-carrier-interference (ICI) caused by the multipath propagation effects. The wideband channel is thereby converted into a set of parallel flat-fading narrowband sub-channels, each sub-channel characterized only by a single complex multiplicative gain.

For a coherent modulated system, this channel gain needs to be estimated at the receiver for each of the subcarriers in order to perform channel equalization and data detection. Estimation of the subcarrier channel gains requires both the transmission of pilot symbols and additional signal processing complexity at the receiver, which is undesirable in some applications. The channel estimation requirements become less stringent when a differential modulation format such as the differential phase shift keying (DPSK) is used. Accordingly, a combination of DPSK modulation with OFDM enables to combine a relatively good robustness against multipath fading and a simple receiver implementation. This combination is used in the Digital Audio Broadcasting (DAB) and Digital Multimedia Broadcasting (DMB) standards, also known collectively as Eureka 147 DAB/DMB standard, which are examples of OFDM systems utilizing differential phase modulation, in particular the, π/4-DQPSK (differential quadrature phase shift keying), in each subcarrier. Eureka 147 DAB has a number of country specific transmission modes, and spectra have been typically allocated for it in Band III (174-240 MHz) and L band (1452-1492 MHz). For worldwide operation a DAB receiver must support the following 4 modes: Mode I for Band III, Earth; Mode II for L-Band, Earth and satellite; Mode III for frequencies below 3 GHz, Earth and satellite; Mode IV for L-Band, Earth and satellite.

Using values for the most commonly used transmission mode on DAB, Transmission Mode I (TM I), the OFDM modulation consists of 1,536 subcarriers that are transmitted in parallel. The useful part of the OFDM symbol period is 1 millisecond, which results in the OFDM subcarriers each having a bandwidth of 1 kHz, and the overall OFDM channel bandwidth is 1,537 MHz. The CP duration for TM I is 246 microseconds, so that the overall OFDM symbol duration is 1.246 milliseconds. The CP duration also determines the maximum separation between transmitters that are part of the same single-frequency network (SFN), which is approximately 74 km for TM I.

Despite its advantage against multipath fading, a conventional OFDM system suffers from two drawbacks in fast-time varying channels. Due to its much longer symbol duration, the subcarrier response between two adjacent symbols is less correlated, which results in significant performance degradation for differential detection when the channel changes faster than the symbols. The second drawback comes from the loss of orthogonality of OFDM subcarriers caused by the Doppler frequency shifts, which appear in mobile reception. Doppler spread generates inter-carrier-interference (ICI), wherein the received signal in one subcarrier contains a certain amount of signal power leaked from adjacent subcarriers. Unlike the thermal noise, which is conventionally denoted as the AWGN noise (additive white Gaussian noise) hereinafter, the effect of ICI cannot be reduced by increasing transmission signal power, since the ICI power increases when the signal power is increased. Therefore, ICI usually results in an error floor in the system bit error rate (BER) performance.

A DAB network can work in one of the four transmission modes, which are characterized by different system parameters, including the number of subcarriers, the subcarrier spacing, the OFDM symbol duration as well as the CP length, as shown in Table 1.

TABLE 1

System parameters of four DAB modes

| | Parameters | Mode I | Mode II | Mode III | Mode IV |
|---|---|---|---|---|---|
| S | No. symbols/frame | 76 | 76 | 153 | 76 |
| K | No. | 1536 | 384 | 192 | 768 |
| N | FFT size (points) | 2048 | 512 | 256 | 1024 |
| $T_s$ | Total symbol duration | ~1246 | ~312 | ~156 | ~623 |
| $T_u$ | Useful symbol | 1000 | 250 | 125 | 500 |
| $T_G$ | Guard interval | ~246 | ~62 | ~31 | ~123 |
| $1/T_u$ | Subcarrier spacing (kHz) | 1 | 4 | 8 | 2 |
| $T_F$ | Frame duration (ms) | 96 | 24 | 24 | 48 |

In a single-frequency network (SFN) configuration, the length of the CP determines the spacing between adjacent DAB transmitters. Therefore, the longer the CP is, the larger the separation between DAB transmitters can be and the fewer the number of transmitters required to cover an entire SFN network. On the other hand, the performance of DAB receivers depend on the normalized Doppler spread, $f_d T_s$, defined as the product of the single-sided Doppler spread $f_d$ and the OFDM symbol duration, $T_s$. The Doppler spread is proportional to both the RF carrier frequency and the vehicle speed. For large values of $f_d$, obtained for instance with DAB transmission at L-band and with car speeds greater than 100 km/h, a DAB system operated in mode III (shortest $T_s$) would perform the best while mode I would perform the worst (longest $T_s$).

Fast fading channels remain a challenge to conventional OFDM systems using differential modulation. For instance, it was shown that the receiver speed is limited to 95 km/h for DAB transmission with mode IV at L-band, for a channel which has the so-called typical urban (TU) multipath power delay profile. This suggests that a satisfactory DAB service is not available for most vehicle receivers running on freeways. Therefore, better detection techniques need to be developed in order to extend the speed limit of reliable operation of wireless OFDM receivers with differential detection such as the DAB/DMB receivers.

It is therefore an object of the present invention to provide a receiver for receiving a differentially modulated multi-carrier signal with an improved performance in fast fading channels.

SUMMARY OF THE INVENTION

In accordance with the invention, there is provided a receiver for receiving a differentially modulated multicarrier (DMM) signal from a communication channel, the DMM signal comprising a plurality of modulated subcarriers, the receiver comprising:

a channel estimator for estimating an inter-symbol channel variation characteristic (ISCVC) based on the received DMM signal and a differentially decoded signal obtained from the received DMM signal;

a first smoothing filter for smoothing the inter-symbol channel variation characteristic in frequency or time and for producing a filtered ISCVC; and, an equalizing differential detector (EDD) for generating the differentially decoded signal from the received DMM signal based on the filtered ISCVC so as to correct for channel-induced distortions of the received DMM signal.

In accordance with one aspect of this invention, the channel estimator comprises a channel gain estimator (CGE) for generating a channel gain estimate of the communication channel based on the received DMM signal and the differentially decoded signal, and an inter-symbol channel variation estimator (ISCVE) for estimating the ISCVC from the subcarrier gain estimates.

Another aspect of the present invention relates to a method in a wireless receiver of decoding a differentially modulated multicarrier (DMM) signal comprising a plurality of modulated subcarriers, the method comprising:

a) receiving the differentially modulated multicarrier (DMM) signal from a communication channel;

b) storing the DMM signal in a buffer memory;

c) obtaining a decoded signal corresponding to the received DMM signal using a differential decoder;

d) estimating channel gain values for the plurality of subcarriers based on the stored DMM signal and the decoded signal;

e) estimating an inter-symbol channel variation characteristic (ISCVC) from the channel gain values;

f) applying a smoothing filter for smoothing the ISCVC in frequency or time to obtain a filtered ISCVC; and, g) updating the decoded signal using the filtered ISCVC so as to at least partially correct for channel-induced distortions thereof.

BRIEF DESCRIPTION OF THE DRAWINGS

The invention will be described in greater detail with reference to the accompanying drawings which represent preferred embodiments thereof, wherein:

FIG. 1 is a schematic block diagram of a prior art DAB transmitter;

FIG. 2 is a diagram illustrating a DAB frame structure;

DETAILED DESCRIPTION

Figure 3:
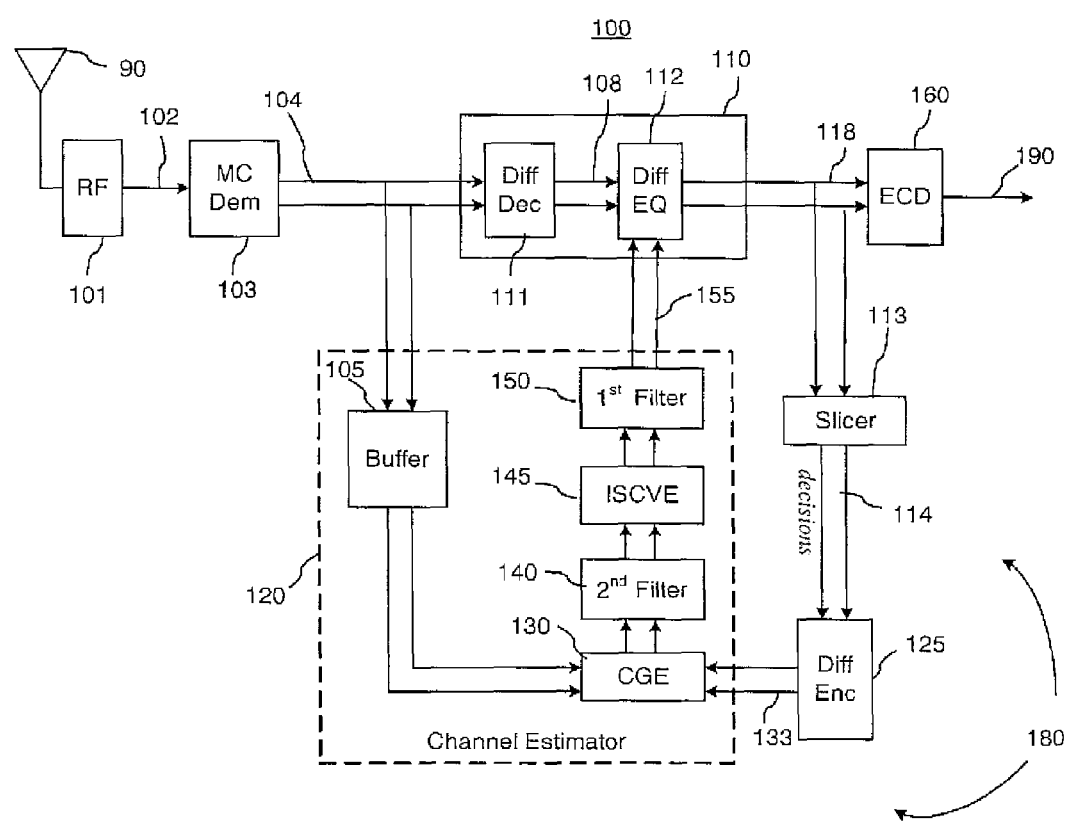
FIG. 3 is a schematic block diagram of a receiver utilizing iterative decision-directed differential detection (iD4) according to one embodiment of the present invention.

The instant invention provides a method for receiving a differentially modulated multicarrier (DMM) signal from a fast fading communication channel, and a receiver implementing this method. The receiver utilizes an iterative decision-directed differential detection (iD$^4$) technique for extracting transmitted data from the received DMM signal with a reduced error rate, and is referred to hereinafter as an iD$^4$ receiver or an iD$^4$-based receiver; it employs an iterative decision-directed estimation of inter-symbol channel variation to equalize the received DMM signal. The invention will be described hereinbelow with reference to exemplary embodiments thereof, some of which may be geared towards OFDM transmission systems; in these embodiments, the DMM signal may be referred to as the OFDM signal. However, the invention is not limited to receiving OFDM signals and encompasses receivers and associated methods for receiving other types of differentially modulated multicarrier signals. A person of ordinary skill in the art will be able to construct such embodiments without undue experimentation in light of the present disclosure.

The following notations are used hereinbelow.

K>1 denotes the number of subcarriers used in the transmission, with particular subcarriers defined by the subcarrier index k=1, . . . , K.

N≥K denotes the size of the IFFT modulator for OFDM.

$a_n(k)$ denotes an n-th transmitted frequency-domain data symbol on the k-th subcarrier before differential encoding.

$x_n(k)$ denotes an n-th transmitted frequency-domain data symbol on the k-th subcarrier after differential encoding.

$s_m$ denotes an m-th transmitted time-domain sample in a time-domain multicarrier (MC) symbol.

$r_m$ denotes the m-th received time-domain sample in a time-domain multicarrier (MC) symbol.

$y_n(k)$ denotes an n-th received frequency-domain sample on the k-th subcarrier before differential decoding.

$b_n(k)$ denotes an n-th estimated frequency-domain data symbol on the k-th subcarrier after differential decoding.

$h(\tau, t)$ denotes the time-domain channel impulse response at time t with delay $\tau$.

$H_n(k)$ denotes a frequency-domain complex channel gain on the $k^{th}$ subcarrier in the $n^{th}$ MC symbol, also referred to hereinbelow as the $k^{th}$ subcarrier channel gain.

In addition, the following is a partial list of abbreviated terms and their definitions used in the specification:

ASIC Application Specific Integrated Circuit
DSP Digital Signal Processing
FPGA Field Programmable Gate Array
ICI Inter-carrier Interference
BER Bit Error Rate
RF Radio Frequency
HF High Frequency
UHF Ultra High Frequency
FFT Fast Fourier Transform
IFFT Inverse Fast Fourier Transform
DFT Discrete Fourier Transform
IDFT Inverse Discrete Fourier transform
FEC Forward Error Correction
SNR Signal to Noise Ratio
PSK Phase Shift Keying
QPSK Quadrature Phase Shift Keying
DQPSK Differential Quadrature Phase Shift Keying
COFDM Coded Orthogonal Frequency Division Multiplexing
SVD Singular Value Decomposition The invention will first be described with reference to exemplary embodiments thereof as applied to a DAB transmission system utilizing OFDM generated DMM signals. FIG. 1 shows an exemplary prior-art OFDM transmitter 10 which generates a DMM signal 80 from an input information bit sequence 11. The input information data 11 may be provided to the transmitter 10 in the form of an input bit sequence 11, encoded in a forward error correction encoder (ECE) 15 with a suitable error correction code such as a Rate-Compatible-Convolutional Code (RCPC). The ECE 15 may include a convolutional time interleaver for time-domain interleaving of the encoded data. Other suitable error correction codes such as Reed-Solomon code can also be used as would be known to those skilled in the art. The encoded bit sequence is then passed onto a multicarrier (MC) encoder 35 that connects to an MC modulator 30. The MC encoder 35 may include an M-ary, for example QPSK, encoder 18, a serial-to-parallel (S/P) converter 20, which may include a frequency domain interleaver, and an MC differential encoder 25 such as an MC DQPSK encoder. The MC modulator 30 may be implemented using an IFFT (inverse fast Fourier transform) processor of size $N \geq K$.

In the MC encoder 35, the encoded bit sequence is first received by the QPSK encoder 18 wherein it is mapped into a QPSK symbol sequence, which is then passed to the S/P converter 20 where it is converted into a sequence of parallel data blocks $a_n = \{a_n(1), \ldots, a_n(K)\} = \{a_n(k)\}, k=1, \ldots, K$, each containing K parallel QPSK symbols, so as to form K parallel data sub-streams $a_n(k)$ 12. After a rearrangement of the relative position of these K QPSK symbols within each block, which is conventionally referred to as the frequency-domain interleaving, this sequence of parallel data blocks is passed to a differential encoder 25 which may be embodied as K parallel DQPSK encoders, each performing the $\pi/4$-DQPSK encoding on a respective sub-stream $a_n(k)$. This generates a sequence of frequency-domain differential MC symbols $x_n = \{x_n(k)\}, k=1, \ldots, K$, each containing K $\pi/4$-DQPSK symbols $x_n(k)$, which is passed to the MC modulator 30. The MC modulator 30 uses these MC symbols to modulate K subcarriers therewith, performs frequency-domain multiplexing of the modulated subcarriers, and generates a time-domain MC symbols as a sequence of signal samples.

In the case of a conventional DAB transmitter, the MC modulator 30 is an OFDM modulator and includes a size N IFFT processor which generates N-point time-domain MC symbols $s_n = \{s_n(m)\}, m=1, 2, \ldots, N$ from the frequency-domain MC symbols $x_n$:

$$s(m) = \frac{1}{\sqrt{K}} \sum_{k=1}^{N} x(k) e^{j2\pi \frac{mk}{N}}, \quad (1)$$

In equation (1), the MC symbol subscript "n", which indicates the position of a particular MC symbol in a sequence of MC symbols that is generated by the MC encoder 35, is omitted. The MC symbols $s_n$ formed in accordance with equation (1) are conventionally referred to as the OFDM symbols. The MC modulator 30 may also include a cyclic guard adder wherein a cyclic guard such as a cyclic prefix (CP) is added at the beginning of each OFDM symbol. The resulting sequence of the time-domain OFDM symbols is then assembled into DAB frames in a DAB framer 50.

By way of example, the frame structure of DAB mode IV in time-frequency representation is illustrated in FIG. 2, where it is shown that one DAB frame consists of a NULL symbol, followed by a Phase Reference Symbol (PRS), followed by multiple data OFDM symbols. No signaling power, or else very low signaling power, is transmitted in the NULL symbol. The PRS provides the reference symbol for each subcarrier for the $\pi/4$-DQPSK encoding/decoding thereof.

The sequence of DAB frames is then passed to an RF transmitter unit 70, which may include at its input a digital-to-analog converter for producing an analog DMM signal. Many variations of the RF transmitter 70 are known in the art, but typically, the RF transmitter 70 includes a low-pass filter, an RF modulator typically using an RF local oscillator for frequency up-converting the analog DMM signal to an RF central frequency, a power amplifier and an antenna.

The analog DMM signal generated by the transmitter 10 is then wirelessly transmitted and can be received by a suitable receiver if a communication channel therebetween can be established. The receiver generally performs the reverse signal processing of the transmitter 10, and therefore typically includes a sequence of elements operating inversely to the elements shown in FIG. 1.

Continuing considering a DAB network by way of example, the transmitter 10 can operate in one of the four transmission modes, each having different system parameters, including the number of subcarriers, the subcarrier spacing, the OFDM symbol duration as well as the CP length, as shown in Table 1. In a single-frequency network (SFN) configuration, the length of the CP determines the spacing between adjacent DAB transmitters. Therefore, the longer the CP is, the larger the separation between DAB transmitter can be and the fewer the number of transmitters required to cover an entire SFN network. If the receivers are mobile, the signal they receive will generally experience multipath interference and Doppler frequency shifts, which combined effect on the transmitted signal can be described in time domain by an impulse response function of the communication channel h($\tau$, t); such a communication channel with multi-path interference and Doppler shifts will be referred to herein as the wireless mobile channel. Assuming that the subcarriers of the DMM signal are closely spaced in frequency, the effect of the wireless mobile channel on each subcarrier can be described by a single complex coefficient $h_k(t)$ that is referred to herein as the subcarrier gain, which however depends on time due to the Doppler effect.

The wireless mobile channel can be modeled as a superposition of M incoming waves as, $$h(\tau, t) = \sum_{i=1}^{M} a_i \cdot e^{-j\varphi_i} \cdot e^{j2\pi f_i t} \cdot \delta(t - \tau_i) \quad (2)$$

where $a_i$, $\tau_i$, $f_i$, and $\phi_i$ represent, for the $i^{th}$ wave, the complex attenuation, the propagation delay, the Doppler shift and the initial phase shift, respectively. In computer modeling, these parameters are typically generated as random variables using pre-defined probability distributions, such as those defined for the Typical Urban (TU) channel in the COST 207 report "Digital land mobile Radio Communications", Commission of European Communities, Directorate General, Telecommunications, Information Industries and Innovation, Luxembourg, 1989.

In particular, the multipath delays, $\tau_i$, can be generated from an exponential distribution, $$p(\tau) = \begin{cases} \dfrac{A}{\sigma_d} \cdot e^{-\tau/\sigma_d}, & 0 \leq \tau \leq \sigma_{max} \\ 0, & \text{else} \end{cases} \quad (3)$$

where $\sigma_d$ is the rms delay spread and $\sigma_{max}$ is the maximum multipath delay. For the TU channels, $\sigma_d=1$ μsec and $\sigma_{max}=7$ μsec. The incoming phase, $\phi_i$, is assumed to be uniformly distributed in [0, 2π) and the Doppler shift, $f_i$, follows the so-called Jakes' model, as described in the book Microwave Mobile Communications by C. Jakes, John Wiley & Sons, Inc., 1974:

$$p(f) = \dfrac{1}{\pi\sqrt{f_d^2 - f^2}} \quad (4)$$

where $f_d$ is the single-sided maximum Doppler spread. A unit channel gain is assumed. Since the delay $\tau_i$ is generated from a statistical distribution, the complex attenuation $a_i$ can be modeled as a constant $1/\sqrt{M}$.

For this channel model, a time-domain channel correlation that is seen by a $k^{th}$ subcarrier is $$R_k(\tau) := E[h_k(t+\tau) \cdot h_k^*(t)] = J_0(2\pi f_d \tau) \quad (5)$$

where $J_0(\ )$ is the zero-order Bessel function of the first kind.

According to equation (5), the time-domain correlation of the subcarrier channel gain depends on the product of the Doppler spread $f_d$ and the relative delay $\tau$. Therefore, the performance of a conventional DMM receiver depends on a time-domain correlation between values of a subcarrier gain coefficient at two adjacent symbols, which are separated in time by one OFDM symbol interval $T_s$; more particularly, the receiver performance depends on the normalized Doppler spread, $f_d T_s$, defined as the product of the single-sided Doppler spread $f_d$ and the OFDM symbol duration, $T_s$. The Doppler spread is proportional to both the RF carrier frequency and the speed with which the receiver moves with respect to the transmitter, such as the speed of the vehicle where the receiver may be located. It is easy to see that, for large values of $f_d$, corresponding for instance to car speeds greater than 100 km/h for DAB transmission at L-band and, a DAB system operated in mode III (shortest $T_s$) would perform the best while mode I would perform the worst (longest $T_s$).

Figure 4:
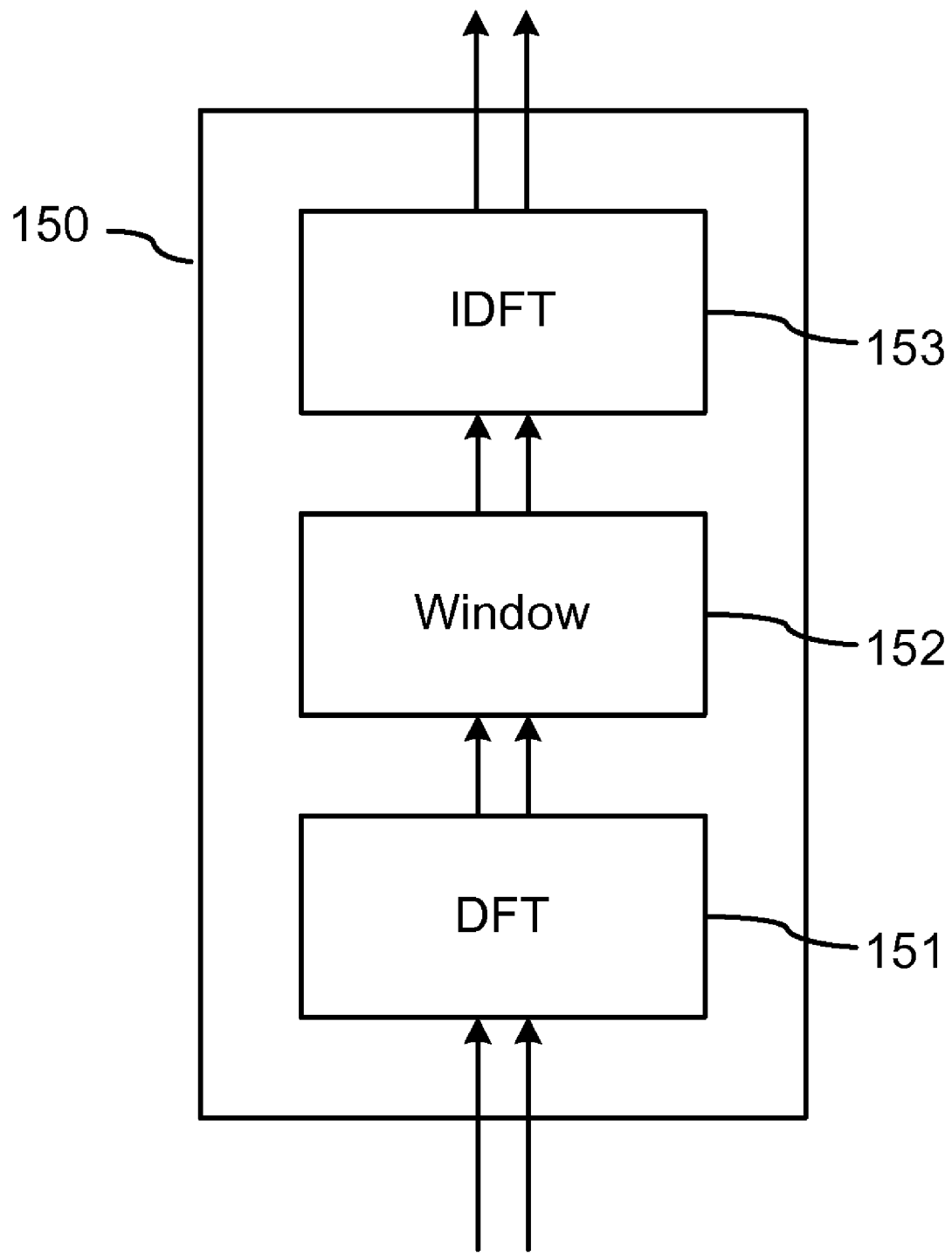
FIG. 4 is a schematic block diagram of one embodiment of a smoothing filter used in the channel estimator of the receiver of FIGS. 3 and 5.
Figure 5:
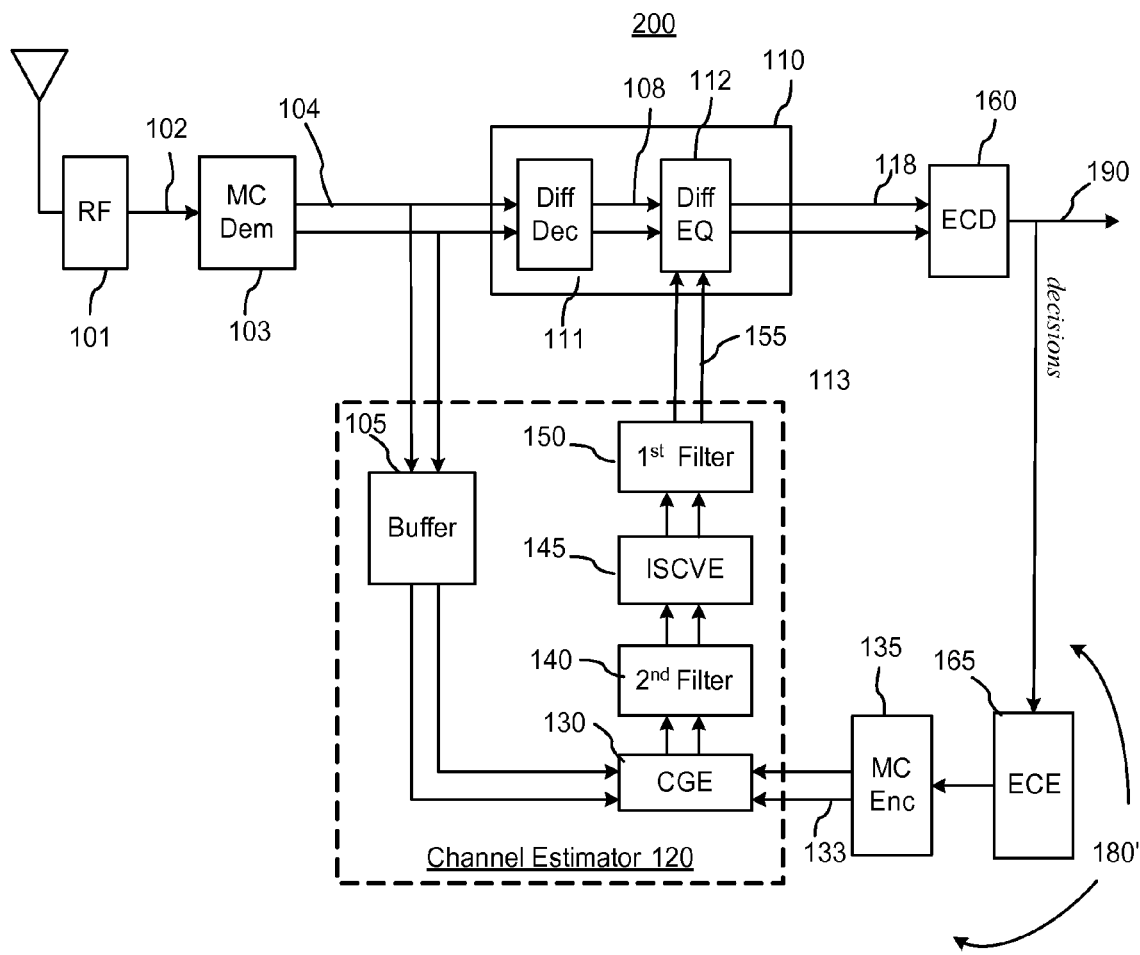
FIG. 5 is a schematic block diagram of the iD4 receiver according to another embodiment of the present invention.
Figure 6:
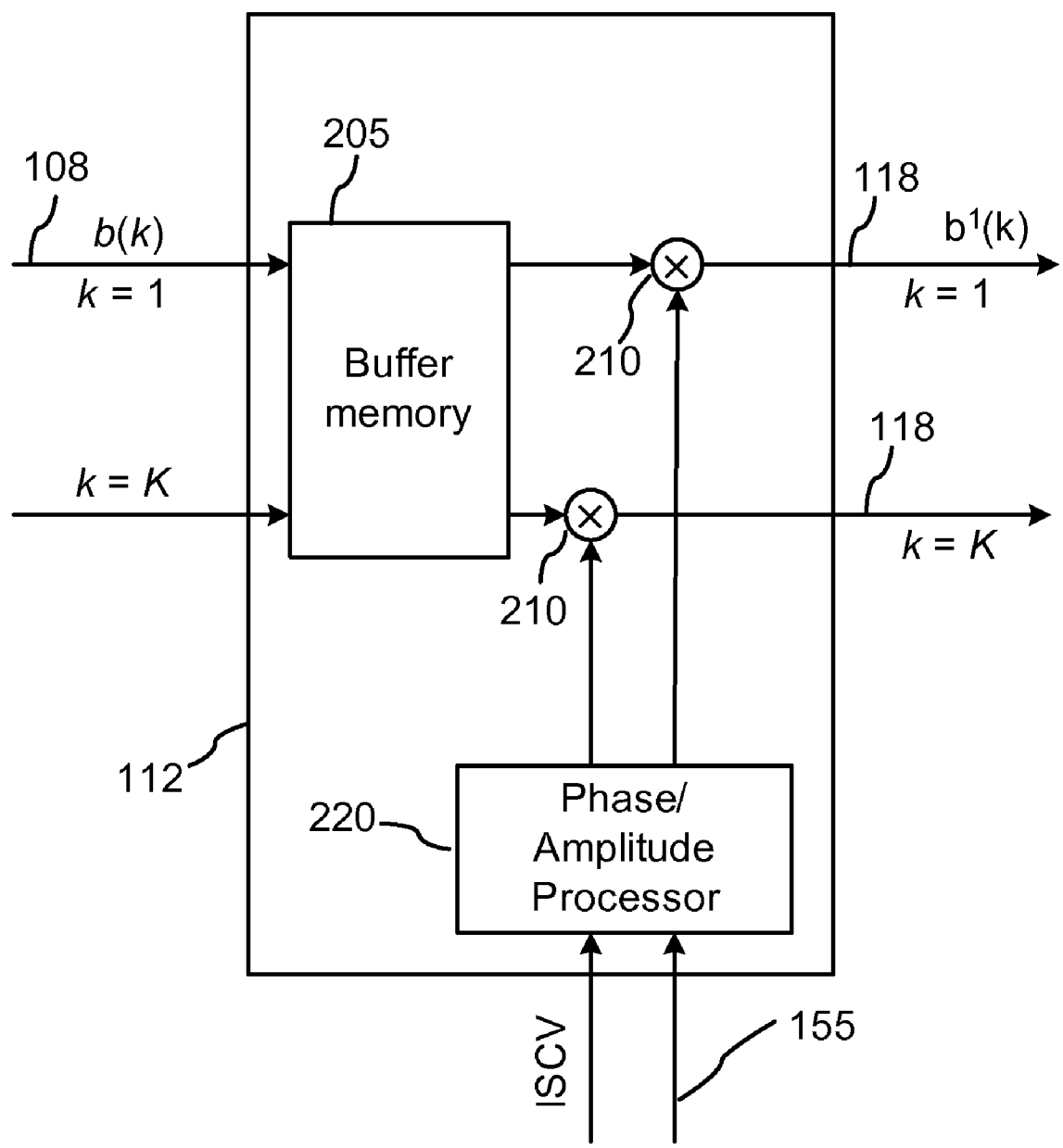
FIG. 6 is a schematic block diagram of one embodiment of a differential equalizer used in the receiver of FIGS. 3 and 5.

The present invention provides an iD$^4$-based receiver with improved performance when receiving DMM signals from time-variant communication channels such as the mobile wireless channels; exemplary embodiments of such a receiver will now be described with reference to FIGS. 3 and 5, with embodiments of some particular elements of the receiver shown in greater detail in FIGS. 4 and 6. Each block in the diagrams shown in FIGS. 3 to 6 is a functional unit of a respective iD$^4$ receiver adopted to perform one or several steps of the method of the present invention in one embodiment thereof, these steps will be also hereinafter described in conjunction with the description of the corresponding functional blocks of the receiver, and also with a flowchart shown in FIG. 8. Arrow pairs between functional blocks represent parallel data links for transmitting K frequency-domain subcarrier signals, also referred to as sub-channels, and may also represent the respective frequency-domain subcarrier signals transmitted between said blocks, while single-arrow connections between blocks represent serial time-domain connections and signals such as sequences of data samples or data symbols. The various functional units shown as blocks in FIGS. 3-6 can be integrated or separate structures implemented in either software or hardware or a combination thereof commonly known to provide the functionalities described hereinbelow, including but not limited to DSPs, ASICs, FPGAs, and analogue RF, HF and UHF circuitry.

Referring first to FIG. 3, there is shown an iD$^4$ receiver 100 according to a first embodiment of the present invention, which may be configured to be suitable for receiving the DMM signal 80 generated by the DMM transmitter 10.

The iD$^4$ receiver 100 shown in FIG. 3 has an RF section formed by a receiver module 101 coupled to an RF antenna 90, and a digital section including an MC demodulator 103, an equalizing differential detector (EDD) 110, and an error correction decoder (ECD) 160, which are operatively connected in series in the recited order. In order to receive the DMM signal and to recover the input data bits that have been encoded into the sub-carriers at the transmitter, the iD$^4$ receiver 100 must perform essentially the inverse of all the operations performed by the respective multi-carrier transmitter 10 described above. Accordingly, the blocks 101, 103, 110 and 160 perform the inverse of the operations that are performed by the blocks 70, 30, 35, and 15, respectively, of the transmitter 10 shown in FIG. 1. Except for a differential equalizer 112 in the EDD 110, these blocks form a conventional DMM signal receiver such as the OFDM DAB receiver, and their various suitable implementations will be known to those skilled in the art.

According to the invention, the iD$^4$ receiver 100 is further provided with a decision feedback circuit 180, which operatively connects an output of the EDD 110 with an equalizer port thereof. In the shown embodiment, the decision feedback circuit 180 includes a slicer 113, a differential encoder 125, and a channel estimator 120, which in turn includes a computer-usable buffer memory module 105 hereafter referred to simply as the buffer 105, a channel gain estimator (CGE) 130, a channel gain smoothing filter 140 also referred to herein as the second smoothing filter 140, an inter-symbol channel variation estimator (ISCVE) 145, and a channel variation smoothing filter 150 also referred to herein as the first smoothing filter 150.

In the shown embodiment, the EDD 110 includes a differential decoder 111 operatively connected to a differential equalizer (DEQ) 112. The differential decoder 111 is adapted, for example programmed, to operate inversely to the differential encoder 25 of the transmitter 10, and can be implemented as a conventional differential decoder (CDD) as known in the arts. The EDD 110 generates a differentially decoded signal 118 in the form of K parallel sub-streams of differentially decoded subcarrier symbol estimates b(k). The ECD 160 may include a slicer for producing hard decisions on "soft" symbol estimates, an M-ary, for example QPSK, decoder, a frequency deinterleaver, a parallel to serial (P/S) converter, a time de-interleaver, and a FEC decoder, as known in the arts.

Operation of the iD$^4$ receiver 100 will now be described by way of example with reference to the OFDM transmission, and in particular with reference to the differentially-modulated OFDM signal produced by the OFDM transmitter 10.

The wireless DMM signal received from the mobile wireless channel with the antenna 90 is first provided to the RF module 101, where it is down-converted in frequency to remove the RF carrier from the signal and digitized at a sampling rate $f_s$ to produce discrete-time waveform samples of the received DMM signal. The difference between the downshifting frequency $f'_c$ of the receiver and the carrier frequency $f_c$ of the transmitter is the frequency offset, $\Delta f = f_c - f'_c$, which should be equal to zero in an ideal receiver; nonzero frequency offset can lead to inter-carrier interference (ICI) and transmission errors.

The output 102 of the RF module 101 is then delivered to the MC demodulator 103 as a complex-valued time-domain received DMM signal $r_m$, where index m represents digitized time samples. In the OFDM embodiment, the MC demodulator 103 includes an N-point FFT processor and additionally may be programmed to identify OFDM symbol boundaries in the received sequence of waveform samples $r_m$, to split it into cyclic-extended OFDM symbols, remove the cyclic prefixes from each such symbol, and to perform the subcarrier frequency de-multiplexing and demodulation by means of the N-point FFT operation, producing thereby the received frequency-domain DMM signal 104 in the form of K parallel sets or streams of complex subcarrier samples or symbols $y_n(k)$, k=1, ..., K, where $y_{n-1}(k)$ and $y_n(k)$ correspond to consecutive data samples received on the k-th subcarrier, and are also referred to herein as (consecutive) estimated subcarrier symbols for the k-th subcarrier, or simply as the received subcarrier symbols. The MC demodulator 103 can also perform additional operations on the samples of the received DMM signal, which may include for example synchronizing a digital to analog converter at the output of the RF module 101 to the timing of the symbols and data samples within the received DMM signal, and estimating and correcting for the carrier frequency offset.

The received frequency-domain DMM signal in the form of a plurality of K received subcarrier samples or symbols $\{y_n(k)\}$ for each transmitted MC symbol is provided to the buffer 105 for storing therein, and to the EDD 110 for generating therefrom the differentially decoded signal 118. The differential decoder 111 is configured, for example programmed to perform an inverse operation of the differential encoder 25 of the transmitter 10 on the received DMM signal.

For a DQPSK encoded DMM signal, the simplest detection algorithm is the conventional differential detection (CDD), that mathematically can be expressed with the following equation (6):

$$b_n(k) = y_n(k) \cdot y_{n-1}^*(k) \qquad (1)$$

where $y_n(k)$ is the received symbol on the $k^{th}$ subcarrier of the $n^{th}$ MC symbol, and $b_n(k)$ represents the $n^{th}$ data symbol of the differentially decoded signal on the $k^{th}$ subcarrier. Differential decoders or demodulators are well known in the arts, and many of them can be suitably used as the differential decoder 111; one example of such a differential decoder/demodulator is described in U.S. Pat. No. 5,841,816, which is incorporated herein by reference. The differentially decoded "soft" subcarrier symbols $b_n(k)$ 108 are provided to the DEQ 112 for differential equalization, i.e. correcting for the distortions caused by channel variations between symbols, and then output from the EDD 110 as a (differentially) decoded signal 118.

The received frequency domain MC symbol $y_n = \{y_n(k)\}$, k=1, ..., K may be significantly distorted by the mobile wireless channel, leading to performance degradation of conventional CDD-based DQPSK decoders in fast fading channels.

Indeed, the received symbol on the $k^{th}$ subcarrier after the OFDM demodulation can be expressed as, $$y_n(k) = x_n(k) \cdot H_n(k) + n_n^{ICI}(k) + n_n^0(k) \qquad (7)$$

where $x_n(k)$ is the n-th transmitted symbol on the $k^{th}$ subcarrier, $H_n(k)$ is the $k^{th}$ subcarrier channel gain, $n_n^{ICI}(k)$ is the ICI contribution from adjacent subcarriers and $n_n^0(k)$ is the AWGN noise. When the receiver moves with respect to the transmitter at a high speed, the ICI becomes the dominant impairment and the AWGN noise could be ignored.

From equations (6) and (7), we have, $$b_n(k) = y_n(k) \cdot y_{n-1}^*(k) \qquad (8)$$
$$\approx a_n(k) \cdot (H_n(k) \cdot H_{n-1}^*(k)) + n_n^d(k)$$
$$= a_n(k) \cdot |H_n(k) \cdot H_{n-1}^*(k)| e^{j\theta_{n,k}} + n_n^d(k)$$

where $\theta_{n,k}$ is a channel phase variation between the $(n-1)^{th}$ and $n^{th}$ symbol on the $k^{th}$ subcarrier and $n_n^d(k)$ is the combined ICI and AWGN noise after detection which has a variance of, $$\sigma_{n|d}^2(k) = |H_n(k)|^2 \cdot \sigma_{n-1,k}^2 + |H_{n-1}(k)|^2 \cdot \sigma_{n,k}^2 \qquad (9)$$

Simulation results for the BER performance of conventional DAB receivers employing the CDD in fading channels show that such conventional receivers suffer significant performance degradation when moving at high speed. For DAB receivers operating in mode IV at L-band, the coded BER requirement of $10^{-4}$ can only be achieved for $f_d T_s$ values less than 0.08, which corresponds to a maximum vehicle speed of about 95 km/h. This suggests that most vehicles on freeways would not obtain good DAB reception using conventional DAB receivers.

The channel variation between two time-adjacent OFDM or, generally, MC symbols is one of the main sources for the receiver performance degradation for DMM signals in fast fading channels. In the current invention, the receiver performance is improved by using the decision directed feedback circuit 180 to estimate an inter-symbol channel variation (ISCV) characteristic 155 based on the decoded signal 118 and the received DMM signal 104, and by utilizing this ISCV characteristic 155 in the differential equalizer 112 to iteratively correct for temporal variations of the communication channel between consecutive data symbols in each subcarrier. Contrary to prior art equalizers that typically divide received signal samples by channel gain estimates to correct for channel-induced distortions, the ISCV characteristic 155 used by the differential equalizer 112 is a differential channel characteristic that represents an estimated change in a channel characteristic between two consecutive data symbols in the received DMM signal for each subcarrier, where the channel characteristic can be the subcarrier channel phase, subcarrier channel gain, and/or subcarrier channel gain amplitude.

This $iD^4$ technique will now be described in greater detail by way of example with reference to the DQPSK modulated OFDM signal composed of frames such as the DAB frame shown in FIG. 2; this technique is however not limited to the differentially modulated OFDM systems but may also be applicable to other MC differential modulation formats with some straightforward modifications, which will be obvious to those skilled in the art having the benefit of the present description.

First, frequency-domain data symbols $y_n$, n=1, ..., $N_s$, of one frame of the received DMM signal are provided from the MC demodulator 103 to the differential decoder 111, and are stored in the buffer 105 for use by the channel estimator 120.

In a first iteration, the differential decoder 111 performs the CDD upon the received frequency-domain samples, and the resulting differentially decoded digital signal is passed generally unchanged through the DEQ 112 and is used by the decision feedback loop 180 to generate the ISCV characteristic 155, which is then used in a next iteration by the DEQ 112 to compute an equalized differentially decoded signal from a differentially decoded signal stored in the first iteration.

The decision feedback loop 180 operates as follows. In each iteration, the differentially decoded signal from the EDD 110 is passed to the slicer 113 for making hard decisions based on the "soft" differentially decoded QPSK symbols $b_n(k)$. The resulting hard decisions signal 114 from the slicer 113 is provided to a differential encoder 125, which operates inversely to the differentially decoder 111 and produces a re-generated DMM signal 133 in the form of a sequence of re-generated DMM symbols $c_n = \{c_n(k)\}$, k=1, ..., K.

The re-generated DMM signal 133 is provided to the channel estimator 120, wherein it is received by the channel gain estimator (CGE) 130. Based on this re-generated DMM signal 133 and the received DMM signal 104 $y_n = \{y_n(k)\}$, k=1, ..., K that has been stored in the buffer 105, the CGE 130 obtains channel gain estimates $\tilde{H}_n(k)$ for each received DMM symbol $y_n$ in a frame, n=1, ..., $N_s$, for example using a least-square (LS) computation that can be described by the following equation (10):

$$\tilde{H}_n(k) = y_n(k) \cdot c_n^*(k). \quad (10)$$

The channel gain estimates for each of the MC symbols and for each of the subcarriers may then be provided to the second smoothing filter 140 for performing time-domain filtering of the channel gain in each of the K subcarriers separately, so as to reduce time-domain noise in the channel gain estimates along each subcarrier; this step of time-domain smoothing of the channel gain estimates is however optional and can be omitted in some embodiments. One of the reasons behind noisy channel gain estimates computed based on the decisions 114 is that these decisions may contain errors, which are referred to herein as errors in the decisions feedback.

The second smoothing filter 140 can be implemented in a variety of ways, as will be appreciated by those skilled in the art. In one exemplary embodiment, the second smoothing filter 140 is a Wiener filter, which may implement a Minimum-Mean-Square-Error (MMSE) algorithm for obtaining subcarrier channel gain estimates with reduced noise. The MMSE channel gain estimation algorithm for the $k^{th}$ subcarrier in the $n^{th}$ OFDM symbol may be mathematically described with the following equation (11), $$\hat{H}_n(k) = \sum_{m=-N_d, m \neq 0}^{N_d} u_m \cdot \tilde{H}_{n-m}(k) \quad (11)$$

which represents a time-domain interpolation of the LS subcarrier gain estimates, where $2N_d$ is a number of taps of the Wiener filter. The coefficients $u_m$ of the linear interpolator in equation (11) can be obtained based on time-frequency correlations of the channel gain, for example based on the following equation (12):

$$u = [u_{-N_d}, u_{-N_d+1}, \ldots, u_{-1}, u_1, \ldots, u_{N_d}] = R^{-1} \cdot p \quad (12)$$

where R is the correlation matrix for the subcarrier gain, whose entries are given by the following equation (13):

$$[R]_{m,n} = R_H(0, m-n) + \sigma^2 \delta_{m,n} \quad (13)$$

where $-N_d \leq m \leq N_d$, $-N_d \leq n \leq N_d$, $m \neq 0$, $n \neq 0$, and vector p is given as $$p = [R_H(0, N_d), \ldots, R_H(0, 1), R_H(0, -1), \ldots, R_H(0, -N_d)] \quad (14)$$

where $R_H(\Delta n, \Delta k)$ is the time-frequency correlation function of the subcarrier channel gain, defined as, $$R_H(\Delta n, \Delta k) = E\{H_{n+\Delta n}(k+\Delta k)H_n^*(k)\} \quad (15)$$

where n is the OFDM symbol index, k is the subcarrier index and $E\{X\}$ represents a math expectation of "X". The channel correlation function $R_H(\Delta n, \Delta k)$ and, therefore, the interpolation coefficients $u_m$ of the second filter can be obtained, for example, by the CGE 130 based on the LS channel gain estimates, and provided therefrom to the second smoothing filter 140.

The computational complexity of the aforedescribed Wiener filter depends on the number filter taps, with more taps resulting in a larger computational complexity but providing a generally better channel estimation and thus potentially improving the receiver performance. Generally there is a saturation point for the number of taps in Wiener filtering, where adding more taps results in negligible performance improvement.

We found that for $f_d T_s$ values less than 0.2, the BER performance saturates for 4 taps. For $f_d T_s$ values greater than 0.2, more taps may be required to achieve the same channel estimation accuracy. Since for DAB receiver operating in mode IV at L-band the $f_d T_s$ value of 0.2 corresponds to the vehicle speeds of 230 km/h, a 4-tap filter maybe sufficient in most practical cases, which corresponds to just 4 additional complex multiplications per subcarrier symbol. In other embodiments, the number of taps may be between 2 and 10, but may also exceed 10 if required by a particular application. Our simulations have shown that the performance degradation observed when using a 4-tap interpolator instead of a 10-tap interpolator is about 5 km/h in terms of the maximum tolerable vehicle speed, or about 0.5 dB SNR penalty for vehicle speeds less than 160 km/h for a target coded BER of $10^{-4}$. Simulations with a 2-tap interpolator showed a significant performance degradation, which is partially due to imperfect decision feedbacks being a more significant detriment to the receiver performance for a small number of filter taps used.

The Wiener filtering operation described by equations (11)-(15) is just one example of possible Wiener filter structures; other Wiener filters such as a linear predictor filter, and generally other types of smoothing filters could also be utilized to smooth out noise-like variations of the subcarrier gain estimates obtain by the CGE 130.

After the time-domain filtering of the subcarrier channel gain estimates, the resulting refined channel gain estimations may be passed to the ISCVE 145 in the form of a vector $\hat{H}$, with elements defined for example by equation (11) with k=1, ..., K, for obtaining the ISCV characteristic 155, for example in the form of another vector of K subcarrier channel variation values for each two consecutive MC symbols in the received DMM signal 104.

The operation of the ISCVE 145 in one embodiment thereof can be described as follows. First, inter-symbol variations $\hat{\Delta}_n(k)|$ of the complex subcarrier channel gains, may be generated for each two consecutive subcarrier gain estimates received from the second filter 140, for example based on the following equation (16):

$$\hat{\Delta}_n(k) = \hat{H}_n(k) \cdot \hat{H}_{n-1}^*(k), \quad (16)$$

where k=1, ..., K. For each received symbol index n, the plurality of K complex inter-symbol subcarrier channel gain variations $\hat{\Delta}_n(k)|$ forms an inter-symbol channel variation (ISCV) vector $\hat{\Delta}_n$, from which an inter-symbol channel phase variation compensation vector $\rho_n$ is generated as $$\rho_n = \frac{\hat{\Delta}_n^*}{|\hat{\Delta}_n|} \quad (17)$$

Note that all entries $\rho_n(k)$ of the vector $\rho_n$ have unit amplitude, i.e.

$$\rho_n(k) = \exp(-j\Delta\phi_n(k)) \quad (18)$$

which allows preserving the proper reliability weighting when the Viterbi decoding is used at the FEC decoder of the ECD 160 after the phase compensation operation. In equation (15), $\Delta\phi_n(k)$ is an estimate of a subcarrier channel phase variation between $n^{th}$ and $(n-1)^{th}$ received MC symbol on the $k^{th}$ subcarrier.

The inter-symbol channel phase variation compensation vector $\rho_n$ can then be passed to the DEQ 112 as the ISCV characteristic 155 and may be used therein to update the differentially decoded subcarrier symbols $b_n(k)$, for example based on the following equation (19):

$$b_n^1(k) = b_n(k) \cdot \rho_n(k)| \quad (19)$$

Here, $b_n(k)$ represents the differentially decoded subcarrier symbols obtained at the very first iteration of the decoding process.

With reference to FIG. 6, one embodiment of the DEQ 112 includes a second buffer memory 205 coupled to a plurality of K multipliers 210, and a phase/amplitude processor (PAP) 220 coupled to second inputs of the multipliers 210. The DEQ 112 performs parallel multi-channel processing of the distorted differentially decoded signal 108, with each sub-channel corresponding to a different subcarrier of the received DMM signal; only two out of K sub-channels are shown for the purpose of illustration, corresponding to the first and last subcarriers, with k=1 and K. Note that each sub-channel may transmit a complex-valued signal, for example in the form of the quadrature components I and Q. Accordingly, the multipliers 210 may be complex multipliers formed with two conventional multipliers and an adder as known in the art.

Initially, the DEQ 112 receives the distorted differentially decoded signal 108 corresponding to the frame that is currently being processed, and may be in the form of the differentially decoded subcarrier symbols $b_n(k)$, k=1, ..., K, n=1, ..., $N_s$. These symbols are stored in the buffer 205, and in the first iteration are passed through the multipliers 210 unchanged. In subsequent iterations, the multipliers 210 multiply the differentially decoded signal that is stored in the buffer 205 by the output of the PAP 220, with the resulting equalized differentially decoded signal 118 from the multipliers 210 provided as the output of the DEQ 112. In one embodiment, the PAP 220 receives the ISCV signal 155 in the form of the complex-valued filtered ISCV vector $\Delta_n$, and computes the phase correction vector $\rho_n$, which elements $\rho_n(k)$ are then passed to the respective multipliers 210 for differentially compensating channel-induced distortions in the received DMM signal.

It will be appreciated that the ISCV characteristic may also be passed to the DEQ 112 in the form of a vector of the inter-symbol subcarrier channel phase variations $\Delta\phi_n(k)$, k=1, ..., K, instead of the complex-valued vector $\rho_n$. Accordingly, the DEQ 112 can be embodied either as a multiplicative differential channel gain compensator as illustrated in FIG. 6, for example implementing the multiplicative operation described by the equation (19), or it can be embodied using differential adders/subtractors implementing a subtractive phase or amplitude correction.

In the case of subtractive phase correction, the differentially decoded symbols 108 may be passed from the differential decoder 111 to the DEQ 112 in the form of differential phase estimates $$\Delta\phi_n(k) = [\phi_n(k) - \phi_{n-1}(k)], \quad (20)$$

where $\phi_n(k)$ is a phase estimate of the n-th received complex-valued subcarrier symbol $y_n(k)$, and the operation performed by the DEQ 112 can be described by the following equation (21):

$$\Delta\phi_n^1(k) = \Delta\phi_n(k) - \Delta\phi_n(k). \, k=1, \ldots, K, \quad (21)$$

Accordingly, in this embodiment the PAP 220 may be programmed to extract the phase of the complex-valued filtered ISCV vector $\Delta n$ received from the channel estimator 120, and the complex multipliers 210 may be substituted with the differential adders or subtractors.

In fast fading channels, the ISCV characteristic generated as described hereinabove may be too noisy to be directly used by the DEQ 112 for equalizing the differentially decoded signal 108, due to excessive noise in the LS channel estimates resulting from high ICI and errors caused by wrong decision feedbacks, which tend to prorogate in time in differential detection and therefore may not be sufficiently suppressed by the time-domain filtering of the subcarrier gain estimates in the second smoothing filter 140. This noise results in large mean square errors (MSE) in the filtered channel gain estimations at the output of the second smoothing filter 140, which subsequently causes large MSE in the inter-symbol subcarrier channel variation estimation, $\hat{\Delta}_n(k)$.

To obtain more accurate ISCV estimation, we can take advantage of the fact that, for typical channel conditions, the channel response, and therefore the channel response variation, changes slowly from subcarrier to subcarrier in the frequency domain, while both the ICI and channel estimation errors caused by wrong decision feedbacks are wideband processes due to the quasi-random nature of the transmission data and of the wrong decision feedbacks. Therefore, a low-pass filtering of the ISCV vector $\hat{\Delta}_n$ in the frequency domain could significantly reduce both the ICI and the estimation errors caused by wrong decision feedbacks.

Therefore, in one embodiment the ISCV vector generated by the ISCVE 145 is passed through the low-pass channel gain variation filter 150, also referred to hereinabove as the first smoothing filter, for smoothing the ISCV vector $\hat{\Delta}_n$ in the frequency domain, so as to reduce noise-related variations between subcarrier ISCV values $\hat{\Delta}_n(k)$ of adjacent subcarriers. This filter can implement a variety of low-pass filtering algorithms as would be appreciated by those skilled in the arts, including Wiener filtering, a simple weighted-averaging window filtering, an MMSE estimation, an SVD-based estimation, and DFT windowing, where DFT stands for the discrete Fourier transform, SVD stand for singular value decomposition.

By way of example, the first smoothing filter 150 may implement the DFT-windowing algorithm. This algorithm is an effective method to perform this low-pass frequency-domain filtering, and is described for example in an article by Y. Zhao and A. Huang, "A Novel Channel Estimation Method for OFDM Mobile Communication Systems Based on Pilot Signals and Cepstrum-Domain Processing", in Proc. VTC'97, pp. 2089-2093, Phoenix, May 1997, which is incorporated herein by reference.

With reference to FIG. 4, in this embodiment the first filter 150 is comprised of a K-point DFT processor 151, a windowing module 152, and a K-point IDFT (inverse DFT) processor 153 connected in series. The DFT processor 151 receives a vector of K ISCV estimates $\hat{\Delta}_n(k)$ from the ISCVE 145, and performs a K-point DFT over this vector to obtain its cepstrum-domain response, $\hat{\eta}_n$, $$\hat{\eta}_n = DFT\{\hat{\Delta}_n\} \tag{22}$$

The windowing module 152 applies a windowing function to the cepstrum-domain spectrum according to the following equation (23):

$$\tilde{\eta}_n = \begin{cases} \hat{\eta}_n, & 0 \le n < w/2 \text{ or } K - w/2 < n \le K \\ 0, & \text{others} \end{cases} \tag{23}$$

Finally, the IDFT processor 153 generates a filtered inter-symbol channel phase variation compensation vector using the K-point IDFT operation:

$$\hat{\Delta} = IDFT\{\tilde{\eta}_n\}. \tag{24}$$

The window size w can be selected based on the following considerations. The DFT-windowing is applied in order to reduce the MSE of the ISCV estimation caused by both ICI and decision feedback errors. When the window size w is too small, part of the cepstrum domain information of the ISCV is discarded, which results in distortion in the refined CV estimates. On the other hand, when the window size is too large, more wideband noise is kept in the CV estimates.

We found that an optimal window size for a wireless mobile channel depends on a multipath delay spread (DS) in the wireless mobile channel, which can be defined based on the following approximate equation:

$$|h(n;\tau)| \begin{cases} > 0 & 0 \le \tau < L \\ = 0 & \tau \ge L \end{cases} \tag{25}$$

where $h(n;\tau)$ is the time-varying channel impulse response during the $n^{th}$ OFDM symbol, with a delay of $\tau$.

In particular, we found that when the channel has a delay spread of L, the time-domain representation of the ISCV vector $\Delta_n = \{\Delta_n(k)\}$, $k = 1, \ldots, K$ has a non-zero duration of 2L−1. The optimal window size in the cepstrum domain is therefore 2L−1.

In this embodiment, finding the optimal window size w for the DFT-windowing may involve a multipath delay spread estimation. This estimation may be carried out periodically during the receiver operation since the multipath delay spread of the channel may change as the receiver moves. For DAB receivers, the multipath DS estimation may be easily achieved, for example using the PRS symbol at the beginning of each transmission frame or based on decision feedbacks as known in the art, and may be performed by the channel estimator 120. The DS estimation may be performed for each DAB frame or at a longer time intervals including 10 or more DAB frames, since the longest frame typically lasts only 0.1 sec within which time interval a constant channel delay spread can be safely assumed.

In some embodiments, the DFT window size may be estimated based on a pre-defined power threshold. Assuming a power threshold of 95% by way of example, the "low-frequency" bins containing 95% of the total power of the cepstrum representation of the ISCV vector may be retained, while the other bins may be assumed to contain noise only and set to zero during the windowing process.

In some embodiments, the channel delay spread L may be taken to be equal to the length of the used guard interval, i.e. to the length of the cyclic prefix which is known to the receiver.

The DFT and IDFT processors 151, 152 can be interchanged, so that the filter 150 includes an IDFT processor followed by a windowing filter followed by a DFT processor.

After the low-pass frequency-domain filtering of the ISCV vector by the first smoothing filter 150, the resulting filtered ISCV vector may then be provided to the DEQ 112 as the ISCV characteristic 155 for utilizing in the differential channel equalization as described hereinabove, for example by first computing the inter-symbol channel phase compensation vector $\rho_n$ using equation (17) and then updating the differentially decoded subcarrier symbols $b_n(k)$ stored from the first iteration prior to equalization according to equation (19) to obtain an equalized differentially decoded signal composed of updated differentially decoded subcarrier symbols $b_n^1(k)$ wherein the time variations of the channel characteristics have been at least partially corrected for.

The more reliable differentially decoded data obtained with the aforedescribed phase compensated differential detection can be fed back again into the decision feedback loop 180 to seek better channel phase variation estimation. This process could be iterated several times until the BER performance of the receiver 100 at the output of the FEC decoder 160 becomes satisfactory, or else after a pre-defined number of iterations has been completed, at which point the differentially decoded and equalized signal 118 at the output of the EDD 110 is provided to the ECD 160 for further error correction processing and decoding to obtain a decoded information bit sequence 190.

In our simulations, we found that the first iteration brings the most significant performance improvement, while performance improvement introduced by subsequent iterations becomes less and less significant. Beyond the $9^{th}$ iterations the BER performance was close to the lower bound, i.e., the BER performance achieved with a Genie-Aided $iD^4$-based receiver, and no further improvement could be obtained.

We also found that the number of iterations that is required for the BER performance of the $iD^4$-based receiver to converge to a lower bound increases with the speed with which the mobile receiver moves, for example when the receiver is located in a moving vehicle. If the vehicle speed is about 90 km/h or less, the $iD^4$ receiver may achieve the lower BER bound with only a single iteration. At vehicle speeds of 130, 150, 160, 170 and 190 km/h, the receiver may achieve the lower BER bound with 2, 3, 4, 6 and 8 iterations in the decision feedback loop 180, respectively. Therefore, the number of iterations implemented in the decision feedback loop of the $iD^4$ receiver maybe a receiver design parameter selected as a trade-off between the vehicle speed limit and the receiver complexity.

After the desired number of iteration is completed, the decoded signal 118 is passed through the FEC decoder 160 and may be provided to a user in the form of the decoded information bit sequence 190. In one embodiment, the DMM signal received by the receiver 100 carries audio and/or video data encoded thereinto by a remote transmitter such as the transmitter 10. In this embodiment, the decoded information bit sequence 190 may be provided to an audio and/or video decoder for extracting therefrom the audio and/or video data, the extracted data, after passing through a digital to analog converter and an optional amplifier, may then be provided to an audio and/or video device to produce a sound or an image displayed on a screen; the respective devices are well known in the art and are not shown in FIG. 3.

In the embodiment described hereinabove with reference to FIG. 3, the re-generated DMM signal 133 is obtained based on the detected signal 118 before the FEC processing in the FEC decoder 160.

Referring now to FIG. 5, another embodiment of the invention provides a $iD^4$ receiver 200 having a decision feedback loop 180' includes the ECD 160 that is operatively connected in series with the EDD 110 for performing error correction in the differentially decoded signal 118 prior to using it in the decision feedback loop 180', and an error correction encoder (ECE) 165. Note that in FIG. 5, elements that are functionally identical to like elements shown in FIG. 3 are identified with like reference numerals and may not be further described.

In the embodiment of FIG. 5, the re-generated DMM signal 133 is obtained based on the detected signal 118 after the FEC processing thereof in the ECD 160. The ECE 165 is configured to operate inversely to the ECD 160. The decision feedback loop 180' further includes an MC encoder 135, which is substantially identical to the MC encoder 35 of the transmitter 10 and includes a QPSK or, generally, an M-ary modulator, an S/P converter, and a differential encoder such as the differential encoder 125 of the decision feedback circuit 180 of FIG. 3, so that the ECE 165 is operatively connected between the ECD 160 and the differential encoder. By placing the error correction decoder 160 within the decision feedback loop 180', the inter-symbol channel variation estimation performed by the channel estimator 120, and therefore the operation of the $iD^4$ receiver 200, may be improved due to a reduced number of decision feedback errors.

Other embodiments of the $iD^4$ based DMM receiver of the present invention are possible. For example, variations of the $ID^4$ receivers 100 and 200 shown in FIGS. 3, 5 may utilize embodiments of the first smoothing filter 150 which are based on an FFT implementation of the DFT windowing described hereinabove with reference to FIG. 4. When the number K of active subcarriers is a power of 2, FFT/IFFT processors could be directly used instead of the DFT processor 151 and the IDFT processor 153 of FIG. 4, resulting in a significant reduction of the receiver complexity.

However, for most current COFDM systems, the number K of active subcarriers is not a power of 2, and the DFT/IDFT operations performed by the first smoothing filter 150 of FIG. 4 may considerably increase the receiver complexity. Computation of a K-point DFT requires $K^2$ complex multiplications, while the complexity of an N-point FFT is $(N/2)*\log_2(N)$ complex multiplications. In the case of DAB mode IV, K=768 and N=1024. The computational complexity of applying a DFT/IDFT pair is therefore 2K=1536 complex multiplications per subcarrier symbol, while the computational complexity of applying an FFT/IFFT pair would be $(N/K) \cdot \log_2(N)$=13.3 complex multiplications per subcarrier symbol. It may be therefore desirable to replace the DFT/IDFT processing performed by the first smoothing filter 150 with FFT/IFFT processing.

Three simplified embodiments of the $1^{st}$ smoothing filter 150 utilizing FFT/IFFT modules instead of the DFT/IDFT modules 151, 153 will now be described. The corresponding filtering algorithms will be collectively referred to as FFT-windowing, as compared to the optimal DFT-windowing described hereinabove with reference to FIG. 4.

I FFT-Windowing with Data Padding (FFT-Padding)

The K-element ISCV vector $\Delta_n$ generated by the ISCVE module 145 may be expanded into a N-symbol vector, where N is the first power of 2 value greater than K, by padding certain data on both sides of the original sequence of elements $\Delta_n(k)$ of the vector $\Delta_n$ as, $$\Delta^N = [\bar{a}_1 \ \Delta^K \ \bar{a}_2] \quad (26)$$

where $\Delta^K$ denotes the original K-symbol vector $\Delta_n$, $\bar{a}_1$ is the left-side padding vector of length $L_1$ and $\bar{a}_2$ is the right-side padding vector of length $L_2$, where $N=L_1+K+L_2$.

The following four padding methods may be implemented in embodiments of the smoothing filter 150:

1) Zero padding: the two data vectors, $\bar{a}_1$ and $\bar{a}_2$ are set to all-zero sequences.

2) Smooth padding: vectors $\bar{a}_1$ and $\bar{a}_2$ are obtained by an extrapolation of the $\Delta^K$ vector in such a way as to ensure a smooth transition at both boundaries.

3) Mirror Image Padding: The $L_1$ entries of the padding vector $\bar{a}_1$ are the mirror image of the first $L_1$ entries of $\Delta^K$. The $L_2$ entries of the padding vector $\bar{a}_2$ are the mirror image of the last $L_2$ entries of $\Delta^K$.

4) Repeat Padding: the first entry of $\Delta^K$ is copied in $\bar{a}_1$ and the last entry is copied in $\bar{a}_2$.

With the N-point padding of the SICV vector, the K-point DFT and IDFT processors 151, 153 can be replaced with N-point FFT and IFFT processors, respectively. The FFT of the expanded ISCV vector $\Delta^N$ has the same cepstrum domain block period as the DFT of the original CV, $\Delta^K$, resulting in a higher cepstrum domain frequency resolution in order to accommodate N points instead of K points. Accordingly, the windowing size used by the windowing module 152 should therefore be increased by a factor N/K as compared to the size-K DFT implementation of the first smoothing filter 150.

We found that the zero-padding introduces significant discontinuity at both edges of the $\Delta^K$ vector, resulting in the appearance of high frequency components in the cepstrum domain after performing the FFT operation on the padded ISCV vector. These high frequency components are discarded by the windowing operation, which causes distortion in the filtered ISCV vector after the IFFT operation. The distortion is the strongest near the two edges of the original CV, $\Delta^K$, where the discontinuity occurs. This so-called "edge effect" may cause estimation errors for the subcarriers near the edges of the MC communication band in the frequency domain.

In order to mitigate this "edge effect", the original $\Delta^K$ vector is extended in the Smooth Padding method, wherein there is a smooth transition at both boundaries between $\Delta^K$ and $\bar{a}_1$ and $\bar{a}_2$ respectively. However, although the effect of the discontinuity is reduced, the expanded ISCV vector $\Delta^N$ is no longer "band-limited" in the cepstrum domain, so that the "edge effect" is reduced but not eliminated. Furthermore, since the data padded on both sides of $\Delta^K$ are noisy CV estimations, this would introduce more estimation error for the windowed CVV.

Padding methods (3) and (4) are two other data padding options which reduce the discontinuity at the edges of the CV vector.

II Overlapped-FFT

Figure 7:
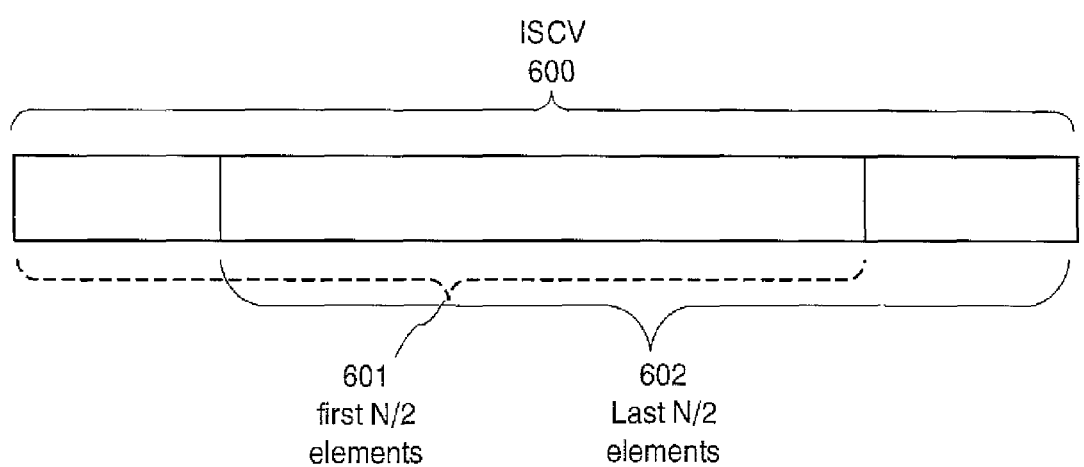
FIG. 7 is a diagram illustrating an overlap-FFT implementation of the smoothing filter used in the channel estimator of the receiver of FIGS. 3 and 5.

Referring to FIG. 7, in this embodiment the FFT windowing is performed over two overlapping portions 601, 602 of the original ISCV vector 600 of length K, with the portions 601 and 602 being of length N/2 each, i.e. consisting of the first N/2 and the last N/2 elements of the ISCV vector 600. Taking the DAB transmission mode IV as an example, the original ISCV vector 600 contains K=768 data carriers, which is not a power of 2. Instead of performing a DFT-windowing over the entire 768-point CVV, in this embodiment the filter 150 performs a first FFT/IFFT windowing over the data block 601 containing the first $N_1$=512 elements of the ISCV vector 600. A second FFT/IFFT windowing may be simultaneously or successively carried out over the second data block 602 containing the last $N_1$ elements from $\Delta^K$. The results of the two FFT/IFFT windowing operations are combined to produce the final filtered K-symbol ISCV vector that is then provided to the DEQ 112.

Performing an $N_1$-point FFT instead of the K-point DFT means a larger spacing, i.e. lower resolution, in the cepstrum domain for the same CVV. Therefore, if a window of size w is applied in DFT-windowing, a window size of w·$N_1$/K must be applied in this Overlapped-FFT embodiment.

Since the $N_1$-long vectors are no longer band-limited, this embodiment may produce "edge effect" and an associated increase in the channel estimation errors for the subcarriers near the edges of the transmission frequency band.

III Linear Interpolation+FFT (Intp-FFT)

Instead of padding data, in this embodiment the original K-point ISCV vector $\Delta^K$ may be oversampled and converted into an N-point vector via a linear interpolation. In general, the channel responses of adjacent subchannels in an OFDM system are highly correlated, therefore, performing such a linear interpolation should provide sufficient accuracy. The linear interpolation is especially simple in the case of the DAB/DMB system, where the ratio of K to N is 3:4 for all four transmission modes. In this case, the interpolator calculates only two points for each 3-symbol sub-block from the original K-point ISCV vector. For DAB mode IV, K=768 and N=1024, this interpolation requires only 1024 complex multiplications. After the FFT-windowing, a vector of length 1024 is generated and a decimation is performed to generate the 768-point filtered ISCV vector, which takes only 512 multiplications. In the Intp-FFT approach, the "cepstrum domain frequency resolution" does not change. Therefore, the window size is the same as that for DFT-windowing.

Since this solution is based on oversampling of the original K-point ISCV vector, it does not produce the "edge effect", but may introduce distortions caused by the linear interpolation process before the FFT-windowing and the decimation process after the FFT-windowing. This distortion is however small when the channel coherent bandwidth is not very small, i.e., is significantly greater than the subcarrier bandwidth. This condition holds in most practical scenarios, wherein the coherent bandwidth is usually much larger than the subcarrier bandwidth, which guarantees negligible performance degradation in this embodiment of the FFT/IFFT windowing method.

A further embodiment of the $1^{st}$ smoothing filter 150 can be based on a simple weight-averaging window, as $$\hat{\Delta}_n(k) = \sum_{i=k-L}^{k+L} a_i \cdot \hat{\Delta}_n(i) \qquad (27)$$

where the weight coefficients $a_i$ may be empirically defined. One example is a unit-weight average window, i.e., $a_i$=1 for all i.

A further embodiment of the $1^{st}$ smoothing filter 150 may be based on an estimated frequency-domain correlation between the inter-symbol subcarrier channel gain variation values $\Delta_n(k)$, and may utilize a so-called Maximum Likelihood (ML) algorithm.

For each subcarrier, the differentially-demodulated data can be expressed as, $$b_n(k) = a_n(k) \cdot (H_n(k) \cdot H_{n-1}^*(k)) + n(k) \qquad (28)$$
$$= a_n(k) \cdot \Delta_n(k) + n(k)$$

where n is the multicarrier symbol index.
The vector form of (28) is, $$b_n = \text{diag}(a_n) \cdot \Delta_n + n_n \qquad (29)$$
$$= A_n \cdot \Delta_n + n_n$$

The Maximum-Likelihood solution for equation (30) is, $$\Delta_n = \frac{\sqrt{E_s}}{N_0} \left( \frac{E_s}{N_0} A_n^* A_n + G_n^{-1} \right)^{-1} \hat{\Delta}_n \qquad (31)$$

The correlation matrix $G_n$, of the ISCV vector may be computed using conventional techniques by the ISCVE 145.

In one embodiment, the first smoothing filter may further utilize a singular value decomposition (SVD) algorithm, for example as described in an article by O. Edfors, M. Sandell, J. J. V. d. Beek, S. Kate and P. O. Borjesson, "OFDM Channel Estimation by Singular Value Decomposition," *IEEE Trans. On Commun.*, Vol. 46, No. 7, July 1998, pp. 931-939, which is incorporated herein by reference.

Application to Other DMM Systems

Although the $iD^4$ receiver of the present invention has been described hereinabove primarily with reference to DAB/DMB transmission systems which utilize the OFDM format with the DQPSK coding of subcarriers, it will be appreciated that the present invention may also be applicable to receivers of other multicarrier transmission systems utilizing same or different types of differential coding in subcarriers.

For example, the iD$^4$ receivers 100 or 200 can be configured for receiving a non-OFDM DMM signal, which can be generated using complex filter banks; some examples of such systems are described in an article by D. S. Waldhauser and J. A. Nossek, Multicarrier systems and filter banks, Adv. Radio Sci., 4, 165-169, 2006; www.adv-radio-sci.net/4/165/2006/, which is incorporated herein by reference. The Filtered-Multitone (FMT) transmission, which has been proposed for very high-speed digital subscriber line standards, is one example of such a non-OFDM multicarrier transmission. One skilled in the art will appreciate that the receivers 100 and 200 can be straightforwardly configured for receiving such a signal, by utilizing a suitable filter bank as the MC demodulator 103 instead of the FFT-based demodulator.

In another embodiment, the iD$^4$ receivers 100 or 200 can be configured for receiving multicarrier signal utilizing differential amplitude modulation of the subcarriers, such as the OFDM/QAM or OFDM/OQAM systems, where OQAM stands for Offset QAM (Quadrature Amplitude Modulation). For such transmission systems, the channel variation estimator 145 of the iD$^4$ receivers 100, 200 may be configured to generate the ISCV vector which elements are estimates of inter-symbol variation of the amplitude of the complex subcarrier channel gains $H_n(k)$, for example according to the equation $$\Delta_n(k)=|H_n(k)|/|H_{n-1}(k)|. \quad (32)$$

Generally, the iD$^4$ method of the present invention as described hereinabove may be directly applicable to any multicarrier transmission systems with differential time-domain modulation in each subcarrier, in which there exists strong frequency-domain correlation between the subcarrier channel gains.

Furthermore, the method can also be easily adapted to improve the performance of other types of multicarrier transmission system, for example those in which the differential modulation is applied in each multicarrier symbol in frequency-domain, i.e. between adjacent subcarriers, and if there exists time-domain correlation for each subcarrier channel gain.

An embodiment of the iD$^4$ receiver 100 or 200 adopted for operating in such a system that employs a DPSK coding of coincidental symbols in adjacent subcarriers, may utilize a frequency-domain differential decoding operation in the differential decoder 111 based on the following equation (33)

$$b_n(k)=y_n(k)\cdot y_n^*(k-1) \quad (33)$$

where $y_n(k)$ and $y_n(k-1)$ are coincidental frequency-adjacent data samples, i.e. are samples of adjacent subcarriers corresponding to the same n-th received MC symbol. Accordingly, in this embodiment the second smoothing filter 140 is a frequency-domain low-pass filter for filtering the complex channel gain vectors $H_n=\{H_n(k)\}$, $k=1, \ldots, K$, along the subcarrier index k; the ML, SVD, Wiener filtering, DFT/IDFT filtering algorithms can be utilized for this frequency-domain filter, making use of the channel frequency-domain statistics. The channel variance estimator 130 computes elements $\Delta_n(k)$ of the ISCV vector by estimating channel variations between frequency-adjacent subcarriers, for example based on the following equation (26) if the DPSK modulation is used:

$$\Delta_n(k)=H_n(k)\cdot H_n^*(k-1) \quad (34)$$

The first smoothing filter 150 in this embodiment is a time-domain filter for filtering each element $\Delta_n(k)$ of the ISCV vector defined by the equation (26) in the time domain, i.e. with respect to the time index n. The ML, Wiener filtering, DFT/IDFT filtering and other suitable filtering algorithms can be utilized.

Figure 8:
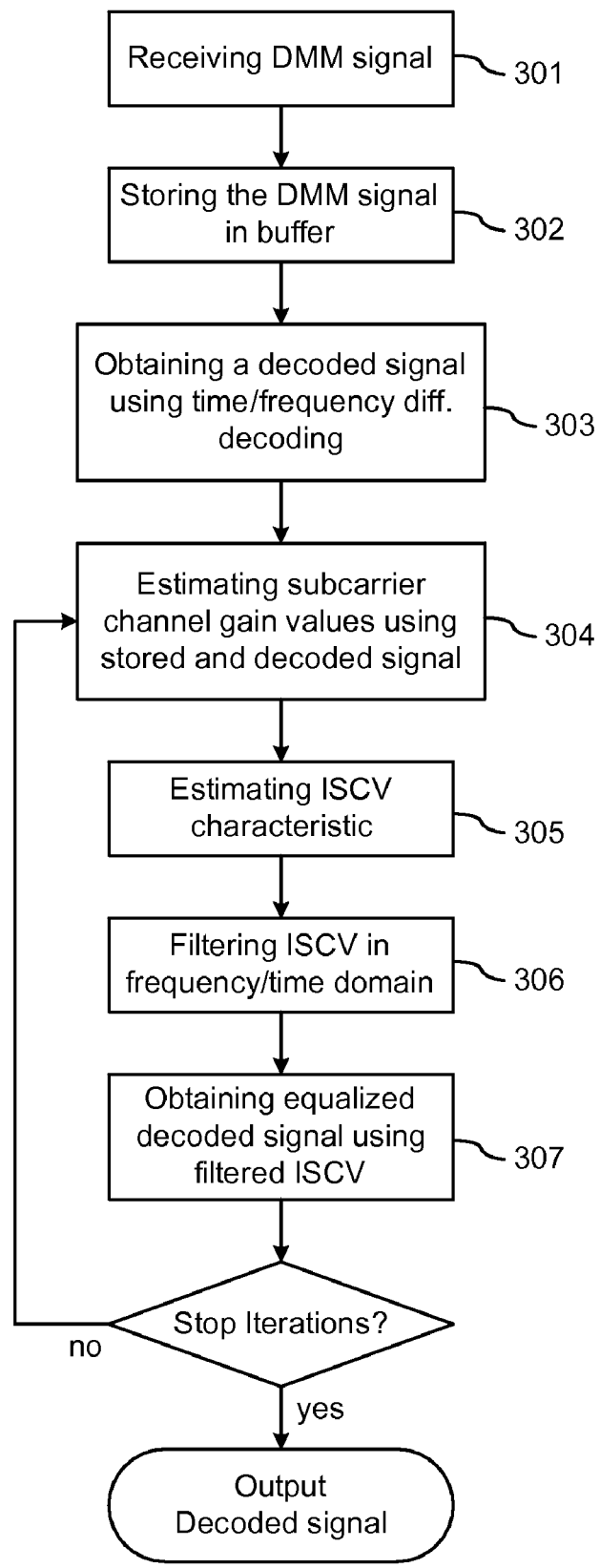
FIG. 8 is a flowchart of the method of the present invention for iterative decision-directed differential detection of multi-carrier signals.

Referring now to FIG. 8, general steps of the method of the present for iterative decision-directed differential detection of transmitted information in a wireless receiver invention can be described as follows:

a) in a step 301, receiving a DMM signal comprising a plurality of modulated subcarriers from a communication channel;

b) in a step 302, storing the DMM signal in a computer-usable buffer memory;

c) in a step 303, obtaining a decoded signal corresponding to the received DMM signal using differential decoding thereof in time or frequency domain;

d) in a step 304, estimating channel gain values for the plurality of subcarriers based on the stored DMM signal and the decoded signal;

e) in a step 305, estimating an inter-symbol channel variation characteristic (ISCVC) from the channel gain values;

f) in a step 306, applying a smoothing filter for smoothing the ISCVC in frequency or time to obtain a filtered ISCVC; in particular, step (f) may perform frequency-domain ISCVC filtering if a time-domain differential decoding is performed in step (c), and step (f) may perform time-domain ISCVC filtering if a frequency-domain differential decoding is performed in step (c); and, g) in a step 307, updating the decoded signal using the filtered ISCVC so as to at least partially correct for channel-induced distortions thereof.

Steps (304)-(307) may be iteratively repeated until a pre-defined condition is fulfilled, for example a pre-defined maximum number of iterations is reached, or the number of symbols or bits in the decoded signal that are changed in successive iterations becomes smaller than a pre-defined threshold.

In one embodiment, the DMM signal may carry audio and/or video data that are encoded into the DMM signal by a remote transmitter such as the transmitter 10. In this embodiment, the method may further comprise the steps of extracting the audio and/or video data from the decoded signal, and using the extracted data to produce an image displayed on a screen or a sound played by an audio device; these steps may be accomplished using various techniques and devices including but not limited to video and audio decoders, digital to analog converters, and amplifiers that are well known in the art and would be apparent to an ordinarily skilled practitioner. The method may be advantageously implemented in a mobile DAB/DMB receiver, for examples located in a moving vehicle resulting in a fast fading communication channel between the transmitter and the receiver, enabling high-quality reception of audio and/or video data at a greater vehicle speed.

The aforedescribed iD$^4$ receiver and method of the present invention can also be adopted for transmission systems utilizing multiple-symbol differential detection (MSDD), as described for example in an article Dariush Divsalar, Marvin K. Simon, "Multiple-Symbol Differential Detection of MPSK," IEEE Trans. on Commun., vol. 38, no. 3, March 1990, pp. 300-308, which is incorporated herein by reference. The MSDD is a method wherein the differential encoding and decoding involves more than two adjacent symbols to achieve better differential detection performance.

The iterative estimation of the inter-symbol channel gain variation produced by the aforedescribed $iD^4$ process can be incorporated in an MSDD detector on each subcarrier for DAB/DMB systems so as to either simplify the detection algorithm or further improve the differential detection performance.

The $iD^4$ receiver 100 or 200 of the present invention can be adopted for use in a MSDD transmission system by suitably configuring the EDD 110 to perform the MSDD decoding utilizing the ISCV characteristic 155 to compensate for the channel variations. One example of equalizing MSDD with the aid of the iterative channel variation estimation according of the present invention can be described as follows.

A conventional DQPSK decoder may implement the following well-known decision rule for decoding over two consecutive symbols:

$$\text{choose } \Delta\hat{\phi}_k \text{ if } Re\{r_k r_{k-1}^* e^{-j\Delta_k}\} \text{ is maximum} \quad (35)$$

When performing an MSDD over three consecutive symbols, the following decision rule can be implemented:
choose $\Delta\hat{\phi}_k$ and $\Delta\hat{\phi}_{k-1}$ if $$Re\{r_k r_{k-1}^* e^{-j\Delta_k} + r_{k-1} r_{k-2}^* e^{-j\Delta_{k-1}} + r_k r_{k-2}^* e^{-j(\Delta_k+\Delta_{k-1})}\}$$
is maximum $\quad (36)$ With the inter-symbol channel phase variation estimation 155 obtained with the aforedescribed $iD^4$ algorithm, the EDD 110 may implement the following equalizing MSDD algorithm:
choose $\Delta\hat{\phi}_k$ and $\Delta\hat{\phi}_{k-1}$ if $$Re\{r_k r_{k-1}^* e^{-j\Delta_k} \cdot e^{-j\Delta\hat{\phi}_k} + r_{k-1} r_{k-2}^* e^{-j\Delta_{k-1}} \cdot e^{-j\Delta\hat{\phi}_{k-1}} +$$
$$r_k r_{k-2}^* e^{-j(\Delta_k+\Delta_{k-1})} \cdot e^{j\Delta(\hat{\phi}_k+\hat{\phi}_{k-1})}\} \text{ is maximum} \quad (37)$$

where $\Delta\hat{\phi}_k$ is the estimated channel phase variation between the $k^{th}$ and $(k-1)^{th}$ symbols. Note that in equations (27)-(29), the subscript index "k" is a time-domain index used to identify successive symbols of a given subcarrier.

In a multiple-carrier system, the detection rule defined by the equation (29) can be applied in each subcarrier to perform the equalizing multiple-symbol differential detection, by making decisions on two consecutive data symbols over an observation period of 3 received symbols. Note that in this embodiment, the functionality of the differential decoder 111, the differential equalizer 112, and the slicer 113 are combined in a single functional EDD module 110 that is configured, e.g. programmed to perform the equalizing MSDD algorithm such as that defined by equation (37). Advantageously, the accurate compensation of the channel gain variations in the received DMM signal produced by $iD^4$ method of the present invention enables to utilize a simpler MSDD detection algorithm.

Performance of $iD^4$ Receivers

Advantageously, the iterative decision-directed differential detection of the present invention enables efficient detection of received signal in fast fading channels and large Doppler spreads, for example as applied to a wireless mobile receiver located in a fast moving vehicle. By way of example, FIGS. 9-13 illustrate the performance improvement that can be obtained in a conventional DAB receiver operating in mode IV, L band ($f_c$=1.5 GHz) by the addition of the iterative decision-directed differential detection according to the present invention, as described hereinabove with reference to FIGS. 3 and 5. The shown results were obtained by simulation, for a transmitter DMM/COFDM signal that is encoded with a rate-1/2 convolutional code with generating polynomials $g_0^{(0)}$=133, $g_0^{(1)}$=171 and a FEC decoder at the receiver utilizing a fixed-point Viterbi decoding with a dynamic range of 9 bits, which performance is close to that of a floating-point Viterbi decoder.

The multipath wireless fading channel is modeled according to the Typical Urban channel model as defined in the COST 207 report, as the most likely mobile environment encountered in real-life applications. The mean multipath delay spread is assumed to be $\sigma_d$=1 μsec, and the maximum multipath delay is $\sigma_{max}$=7 μsec. For one channel realization, a total of 80 DAB mode IV frames are transmitted and the BER is calculated. This corresponds to 4.4 million transmitted information bits and therefore, BER results higher than $2 \cdot 10^{-5}$ have good confidence interval, with 100 bit errors accumulated during the simulation. Simulations were performed for 10 different channel realizations, and the average BER performance is reported in the figures.

In the FIGS. 9-13, the performance of the $iD^4$ receiver 200 shown in FIG. 5 is compared to that of a conventional DAB receiver, which differs from the $iD^4$ receiver 200 in that the conventional DAB receiver lacks the decision feedback loop 180', including the channel estimator 120, the ECE 165 and the MC encoder 135, and further lacks the DEQ 112, which can also be considered as a part of the decision feedback loop 180' of the present invention. In the exemplary embodiment of the $iD^4$ receiver 200 to which the results of FIGS. 9-12 pertain, the $2^{nd}$ smoothing filter 140 is a one-dimensional time-domain linear interpolator (ID-LI) having 10-tap, with 5 taps on each side. The $1^{st}$ smoothing filter 150 is a frequency-domain DFT windowing filter as shown in FIG. 5, with a window size of 40 samples. The differential decoder 11 of the $iD^4$-based receiver 200 performs the CDD, followed by up to 9 iterations of decision-directed ISCV estimation and phase-compensated DQPSK detection. The performance of the $iD^4$ receiver 200 after a limited number of iteration is also compared with the best achievable performance, i.e., that of a Genie-aided $iD^4$ receiver with perfect decision feedback (DF), which is shown in the figures with a thick black curve. Simulations were performed for a range of the Doppler spread values $f_d T_s$, from very slowly-varying wireless mobile fading channels corresponding to $f_d T_s$=0.001, to very fast-fading channels, corresponding to $f_d T_s$=0.16. The vehicle speeds corresponding to these $f_d T_s$ values in DAB mode IV at L-band are listed in Table 2.

TABLE 2

Vehicle speed (km/h) vs $f_d T_s$, DAB mode IV, L-band

| | $f_d T_s$ | | | | | | | |
|---|---|---|---|---|---|---|---|---|
| | 0.001 | 0.005 | 0.01 | 0.02 | 0.03 | 0.04 | 0.05 | 0.06 | 0.07 |
| Vehicle speed [km/h] | 1.16 | 5.78 | 11.56 | 23.11 | 34.67 | 46.23 | 57.78 | 69.34 | 80.90 |

TABLE 2-continued

Vehicle speed (km/h) vs $f_dT_s$, DAB mode IV, L-band

| | $f_dT_s$ | | | | | | | |
|---|---|---|---|---|---|---|---|---|
| | 0.08 | 0.09 | 0.10 | 0.11 | 0.12 | 0.13 | 0.14 | 0.15 | 0.16 |
| Vehicle speed [km/h] | 92.46 | 104.0 | 115.6 | 127.1 | 138.7 | 150.2 | 161.8 | 173.4 | 184.9 |

Figure 9:
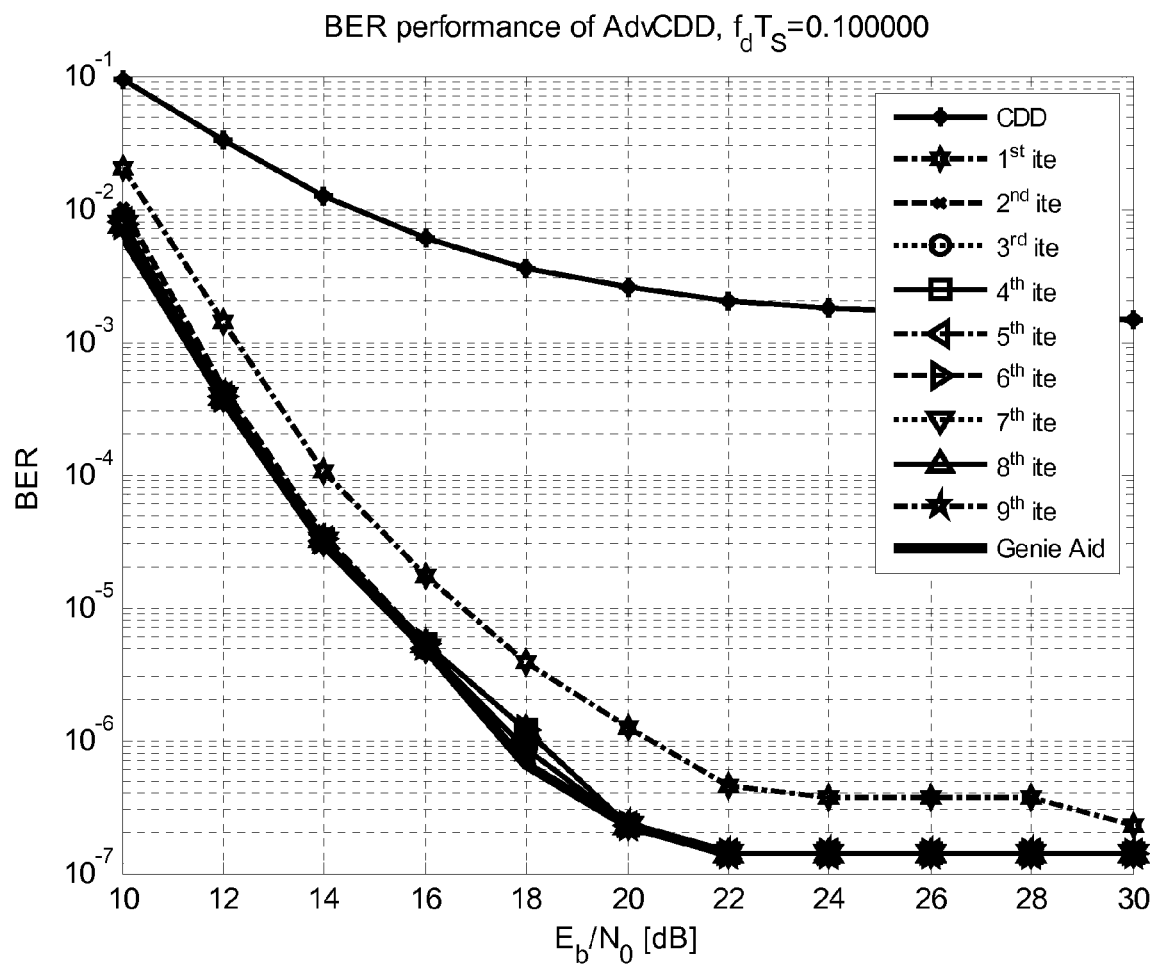
FIG. 9 is a graph illustrating the BER performance of the receiver of the present invention for a relative value of the Doppler spread $f_d T_s = 0.1$ in dependence upon the number of iterations in the decision feedback loop.

In FIG. 9, the coded BER performance at the output of the FEC decoder 160 of the iD$^4$ receiver 200 is shown for an $f_dT_s$ value of 0.1, which corresponds to a vehicle speed of 116 km/h. This figure shows that the CDD-based receiver does not achieve the target BER of $10^{-4}$ for any SNR values $E_b/N_0$. The iD$^4$ receiver of the present invention achieves the target BER with one iteration at an SNR of 14 dB. Here, a typical link budget of 14 dB C/N is assumed, which corresponds to an equivalent $E_b/N_0$ value of 15.3 dB for a rate-1/2 coded DAB service. Performing a second iteration provides another 1 dB SNR gain at BER of $10^{-4}$. The BER performance of the $2^{nd}$ iteration is very close to the performance of the Genie-aided iD$^4$ system for this vehicle speed, and further iterations do not lead to appreciable performance improvement.

Figure 10:
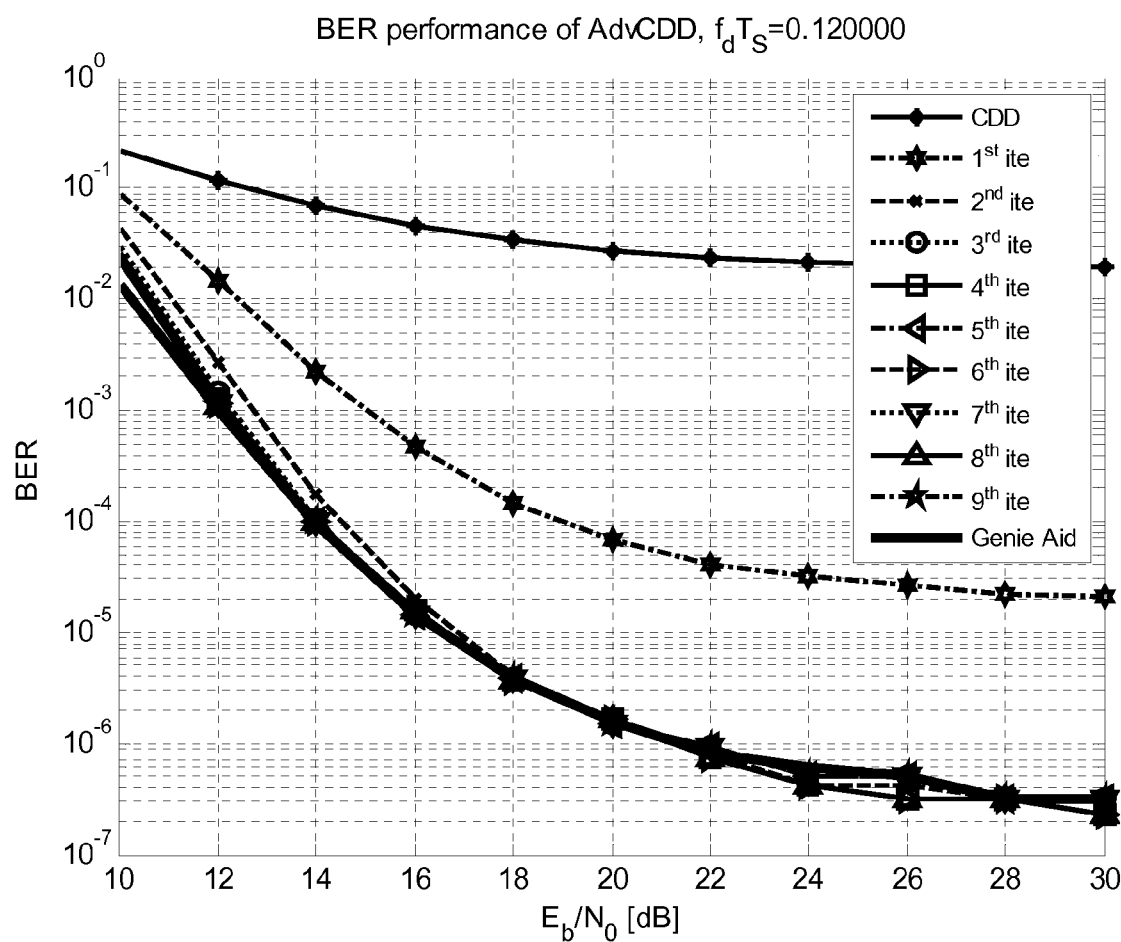
FIG. 10 is a graph illustrating the BER performance of the receiver of the present invention for a relative value of the Doppler spread $f_d T_s = 0.12$ in dependence upon the number of iterations in the decision feedback loop.

In FIG. 10, the coded BER performance at the output of the FEC decoder 160 of the iD$^4$ receiver 200 is shown for an $f_dT_s$ value of 0.12, which corresponds to a vehicle speed of 139 km/h. An error floor of about 0.02 is shown for the CDD-based conventional receivers. The target BER of $10^{-4}$ is achieved by the iD$^4$-based receiver at SNR values of 19, 14.5 and 14 dB with one, two and three iterations, respectively. The performance of the iD$^4$-based receiver saturates for this vehicle speed after 3 iterations.

Figure 11:
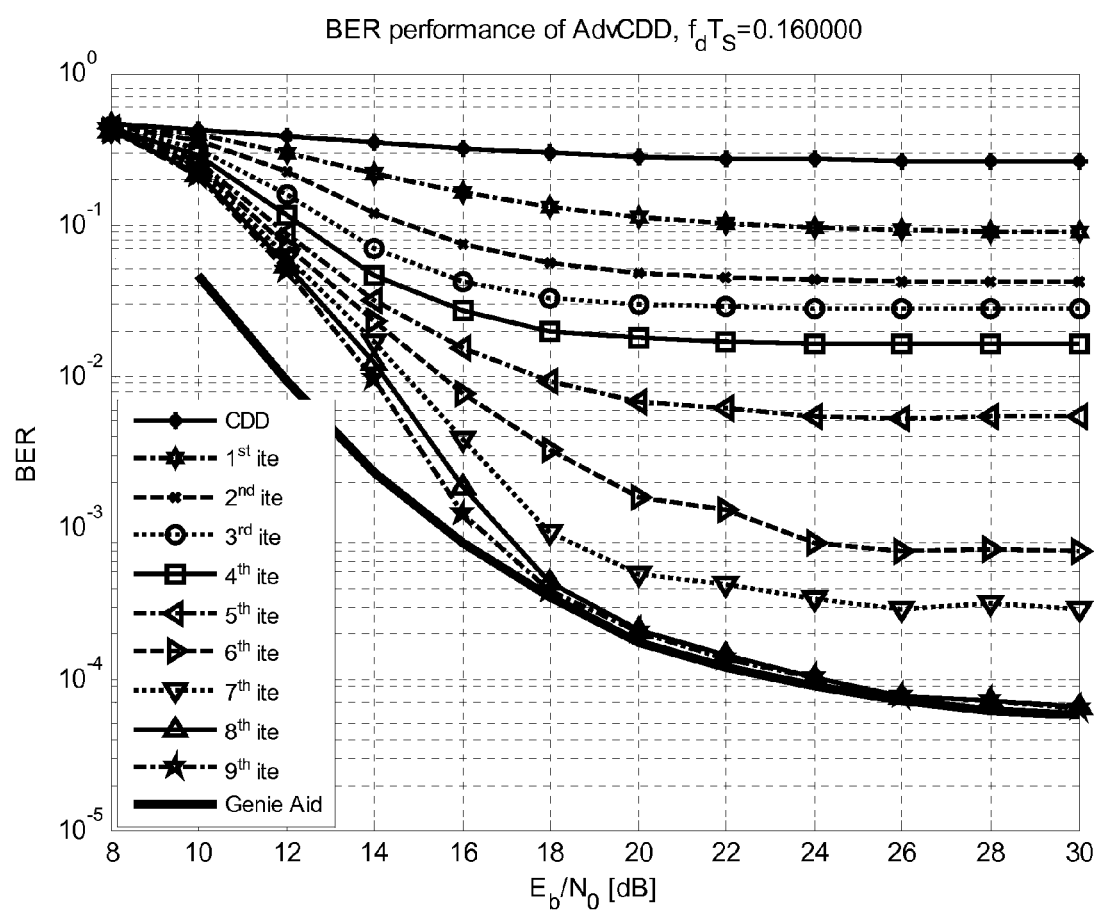
FIG. 11 is a graph illustrating the BER performance of the receiver of the present invention for a relative value of the Doppler spread $f_d T_s = 0.16$ in dependence upon the number of iterations in the decision feedback loop.

In FIG. 11, the coded BER performance of CDD and iD$^4$-based DAB receivers for a very fast fading channel with an $f_dT_s$ value of 0.16, i.e. vehicle speed of 185 km/h, is plotted. The target BER of $10^{-4}$ is achieved by the iD$^4$-based DAB receiver with 8 iterations, and is achieved for an SNR of 24 dB, about 1 dB away from the 23 dB lower bound obtained with a Genie-aided iD$^4$ receiver.

Figure 12:
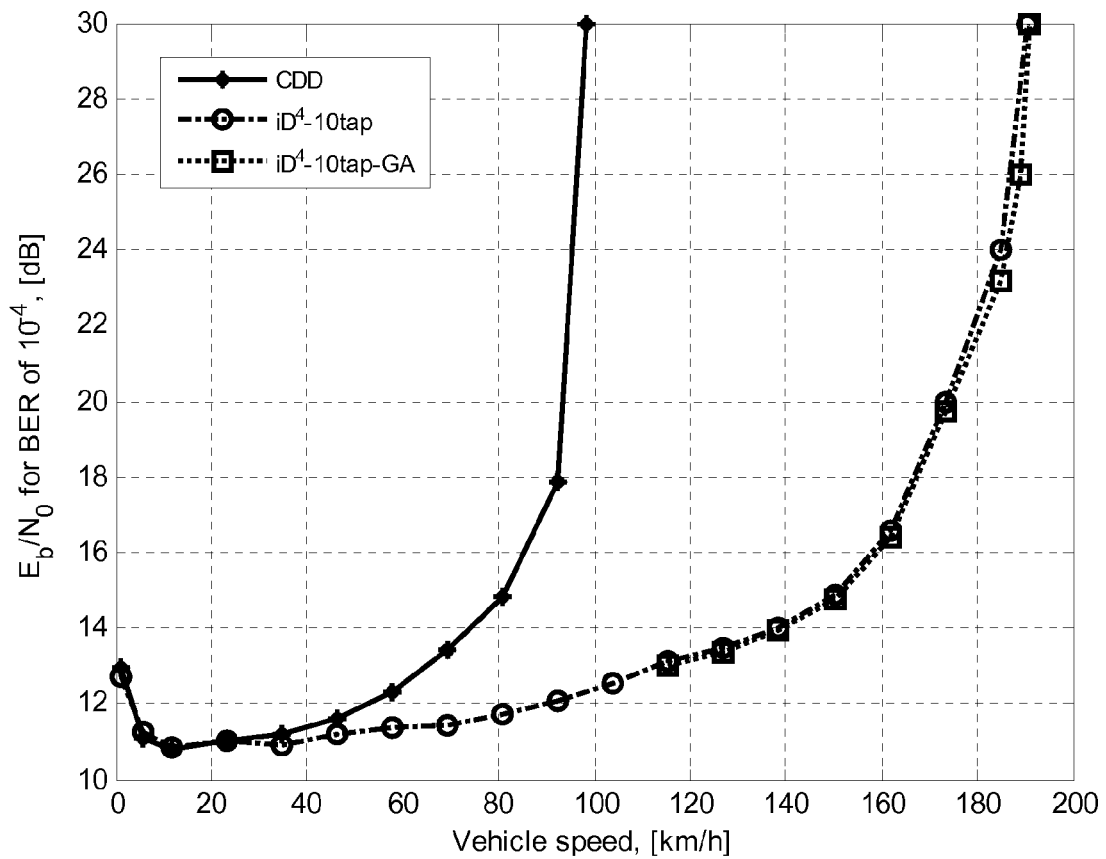
FIG. 12 is a graph illustrating the SNR requirements of the receiver for BER of $10^{-4}$ of the present invention and the prior art receiver in dependence upon the vehicle speed.

In FIG. 12, the $E_b/N_0$ SNR values required for the conventional and iD$^4$-based DAB receivers to achieve a coded BER of $10^{-4}$ is plotted for different vehicle speeds. It is clearly seen that the conventional DAB receiver based on CDD cannot obtain a satisfactory reception at vehicle speed over 95 km/h. Advantageously, the iD$^4$ method implemented in the wireless receiver of the present invention enables satisfactory signal reception for vehicle speeds up to 190 km/h in a typical Urban environment.

Figure 13:
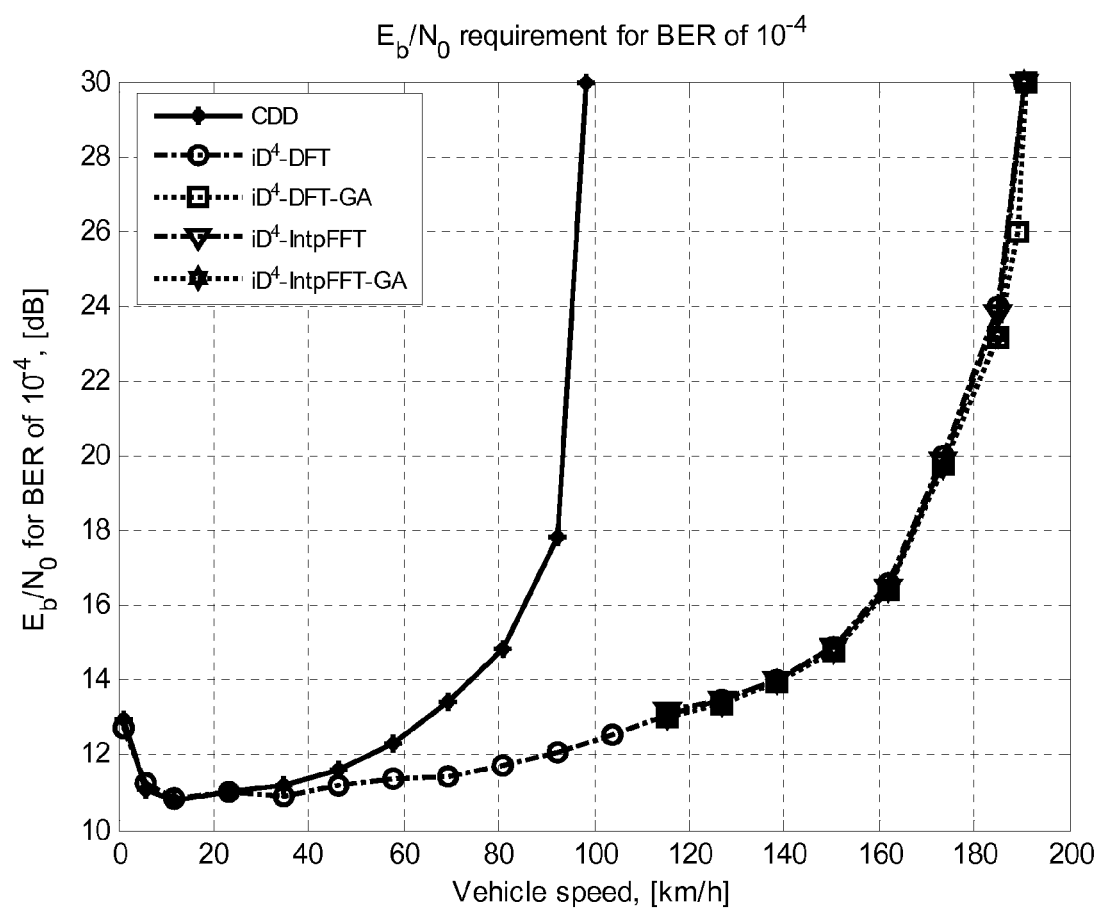
FIG. 13 is a graph comparing the SNR requirements of the receiver of the present invention for the DFT-based and FFT-based implementations of the channel gain variation smoothing filter.

In FIG. 13, the SNR values required to achieve the target coded BER of $10^{-4}$ at different vehicle speeds are compared for iD$^4$-based DAB receivers which employ different types of ISCV smoothing filters, namely the DFT/IDFT based filter shown in FIG. 4 and the simplified IntpFFT smoothing filter based on the FFT/IFFT filter and linear interpolation, as described hereinabove. The curves labeled GA (Genie Aided) correspond to the ideal case of perfect decision feedbacks in iD$^4$. There is very small performance degradation between the IntpFFT windowing with actual decision feedbacks and its ideal GA counterpart. There is also very small performance degradation between the IntpFFT and the DFT windowing, for both actual and GA decision feedbacks. Vehicle speed is limited to a maximum of about 95 km/h for CDD with Mode IV at L-band as compared to 190 km/h with iD$^4$, a gain of 95 km/h. At an $E_b/N_0$ value of 20 dB, vehicle speeds up to 175 km/h can be reached with iD$^4$ as compared to about 90 km/h with CDD.

The present invention has been fully described in conjunction with the exemplary embodiments thereof with reference to the accompanying drawings. Of course numerous other embodiments may be envisioned without departing from the spirit and scope of the invention. For example, although in FIGS. 3 and 5 the first filter is shown to be included in the channel estimator 120 as a separate functional block, in other embodiments it can be implemented as a part of the DEQ 112, or its functionality included in the ISCVE 145. It is also to be understood that each of the preceding embodiments of the present invention may utilize a portion of another embodiment, and that various changes and modifications to the aforedescribed embodiments may be apparent to those skilled in the art. Such changes and modifications are to be understood as included within the scope of the present invention as defined by the appended claims.

We claim:

1. A receiver for receiving a differentially modulated multicarrier (DMM) signal from a communication channel, the DMM signal comprising a plurality of modulated subcarriers, the receiver comprising:
    a channel estimator for estimating an inter-symbol channel variation characteristic (ISCVC) based on the received DMM signal and a differentially decoded signal obtained from the received DMM signal;
    a first smoothing filter for smoothing the inter-symbol channel variation characteristic in frequency or time and for producing a filtered ISCVC; and,
    an equalizing differential detector (EDD) for generating the differentially decoded signal from the received DMM signal based on the filtered ISCVC so as to correct for channel-induced distortions of the received DMM signal.

2. A receiver of claim 1, wherein the channel estimator comprises:
    a channel gain estimator (CGE) for generating a channel gain estimate of the communication channel based on the received DMM signal and the differentially decoded signal; and,
    an inter-symbol channel variation estimator (ISCVE) for estimating the ISCVC from the subcarrier gain estimates.

3. A receiver of claim 1, wherein the DMM signal comprises an OFDM signal.

4. A receiver of claim 1, wherein the channel estimator includes the first smoothing filter.

5. A receiver for receiving a differentially modulated multicarrier (DMM) signal from a communication channel, the DMM signal comprising a plurality of modulated subcarriers, the receiver comprising:
    a channel estimator for estimating an inter-symbol channel variation characteristic (ISCVC) based on the received DMM signal and a differentially decoded signal obtained from the received DMM signal, wherein the channel estimator comprises:
- a channel gain estimator (CGE) for generating a channel gain estimate of the communication channel based on the received DMM signal and the differentially decoded signal; and,
- an inter-symbol channel variation estimator (ISCVE) for estimating the ISCVC from the subcarrier gain estimates;
- a first smoothing filter for smoothing the inter-symbol channel variation characteristic in frequency or time and for producing a filtered ISCVC; and,
- an equalizing differential detector (EDD) for generating the differentially decoded signal from the received DMM signal based on the filtered ISCVC so as to correct for channel-induced distortions of the received DMM signal;
- wherein the channel estimator further includes a second smoothing filter operatively connected between the CGE and the ISCVE for:
  - smoothing the channel gain estimate in time if the first smoothing filter is for smoothing the differential channel characteristic in frequency, or
  - smoothing the channel gain estimate in frequency if the first smoothing filter is for smoothing the differential channel characteristic in time.

6. A receiver of claim 5 further comprising a differential encoder operatively connected to an output of the EDD for producing a re-generated DMM signal based on the differentially decoded signal, wherein the channel estimator is operatively connected to the differential encoder so as to form a decision feedback loop for iteratively correcting channel-induced distortions in the differentially decoded signal.

7. A receiver of claim 6 wherein the decision feedback loop further comprises:
- an error correction decoder (ECD) operatively connected in series with the EDD for performing error correction in the differentially decoded signal; and,
- an error correction encoder (ECE) complimentary to the ECD and operatively connected between the ECD and the differential encoder for encoding the differentially decoded signal with an error correction code.

8. A receiver of claim 6 wherein the channel gain estimator is coupled to the differential encoder for generating subcarrier channel gain estimates based on the received DMM signal and the re-generated DMM signal.

9. A receiver of claim 5, wherein the channel estimator is for estimating a plurality of subcarrier ISCVC values representing an inter-symbol channel phase variation, an inter-symbol channel amplitude variation, or an inter-symbol channel gain variation for each of the modulated subcarriers.

10. A receiver of claim 9, wherein the DMM signal is modulated differentially in time, and wherein the first smoothing filter is a frequency-domain filter for smoothing the ISCVC in frequency by reducing noise-induced variations between subcarrier ISCVC values of adjacent subcarriers.

11. A receiver of claim 10, wherein the second smoothing filter comprises one of: a time-domain Wiener filter, a time domain DFT/IDFT based smoothing filter, a time-domain MMSE estimator, or a time-domain weighted-averaging windowing filter.

12. A receiver of claim 10, wherein the first smoothing filter is a frequency-domain filter for smoothing variations between the ISCVC values of adjacent subcarriers based on at least one of:
- a channel delay spread estimation,
- a frequency-domain correlation between subcarrier channel gain variation values, and
- a known guard interval length.

13. A receiver of claim 10, wherein the first smoothing filter utilizes one of: DFT/IDFT-based filter, a Wiener filter, a weighted-averaging windowing function, an MMSE estimator, or a SVD-based estimator.

14. A receiver of claim 13, wherein the DFT/IDFT-based filter utilizes one of: a DFT processor followed by a windowing module followed by an IDFT processor or an IDFT processor followed by a windowing module followed by a DFT processor.

15. A receiver of claim 5, wherein the DMM signal is modulated differentially in frequency, the second smoothing filter is for smoothing the channel gain estimate in frequency, and the first smoothing filter is for smoothing the differential channel characteristic in time.

16. In a wireless receiver, a method of decoding a differentially modulated multicarrier (DMM) signal comprising a plurality of modulated subcarriers, the method comprising:
a) receiving the differentially modulated multicarrier (DMM) signal from a communication channel;
b) storing the DMM signal in a computer-usable buffer memory;
c) obtaining a decoded signal corresponding to the received DMM signal using a differential decoder;
d) estimating channel gain values for the plurality of subcarriers based on the stored DMM signal and the decoded signal;
e) estimating an inter-symbol channel variation characteristic (ISCVC) from the channel gain values;
f) applying a smoothing filter for smoothing the ISCVC in frequency or time to obtain a filtered ISCVC; and,
g) updating the decoded signal using the filtered ISCVC so as to at least partially correct for channel-induced distortions thereof.

17. A method of claim 16, wherein steps (d)-(g) are performed iteratively.

18. A method of claim 16, wherein step (f) includes performing DFT/IDFT processing or FFT/IFFT processing of the ISCVC.

19. A method of claim 16, further comprising estimating a time delay spread of the channel for determining a size of a DFT window utilized in step (f).

20. A method of claim 16, wherein the DMM signal is modulated differentially in time domain with respect to consecutive data symbols in each subcarrier, and wherein:
- step (e) comprises estimating at least one of: channel phase variations and channel amplitude variations in the time domain for consecutive symbols in each of the subcarriers; and,
- the smoothing filter in step (f) is applied in the frequency domain with respect to coincidental symbols in adjacent subcarriers.

21. A method of claim 16, wherein the DMM signal is differentially modulated in frequency domain with respect to adjacent subcarriers, and wherein:
- step (e) comprises estimating at least one of:
- channel phase variations and channel amplitude variations in the frequency domain between coincidental symbols of adjacent subcarriers; and,
- the smoothing filter in step (f) is applied in the time domain with respect to consecutive symbols in each of the subcarriers.

22. A method of claim 16 wherein step (g) comprises performing multiple-symbol differential detection.

23. A method of claim 16, wherein the DMM signal comprises audio or video data, further comprising:
   extracting the audio or video data from the decoded signal, and
   using the extracted data to produce an image displayed on a screen or a sound played by an audio device.

* * * * *